United States Patent Office 3,086,029
Patented Apr. 16, 1963

1

3,086,029
16α,17α-METHYLENE-6-SUBSTITUTED PROGES-
TERONES AND PROCESS THEREFOR
J Allan Campbell, John C. Babcock, and William J.
Wechter, Kalamazoo, Mich., assignors to The Upjohn
Company, Kalamazoo, Mich., a corporation of Delaware
No Drawing. Filed Jan. 12, 1962, Ser. No. 165,954
20 Claims. (Cl. 260—397.3)

This invention relates to 16α,17α-methylene-6-substituted progesterones, intermediates therefor and processes for the production thereof. It is particularly concerned with 16α,17α-methylene-6α-methyl-4-pregnene-3,20-dione, 16α,17α-methylene-6α-fluoro-4-pregnene-3,20-dione, 16α,17α-methylene-6α-chloro-4-pregnene-3,20-dione and the corresponding $\Delta^6$, $\Delta^1$ and $\Delta^{1,6}$-derivatives thereof. The present invention also relates to the corresponding compounds possessing 11(α and β)-hydroxy and 11-keto substituents. The 9α-fluoro analogues of all of the aforesaid compounds and intermediates therefor are also embraced within the scope of this invention.

The compounds of this invention and a process of production thereof are illustratively represented by the following sequence of formulae:

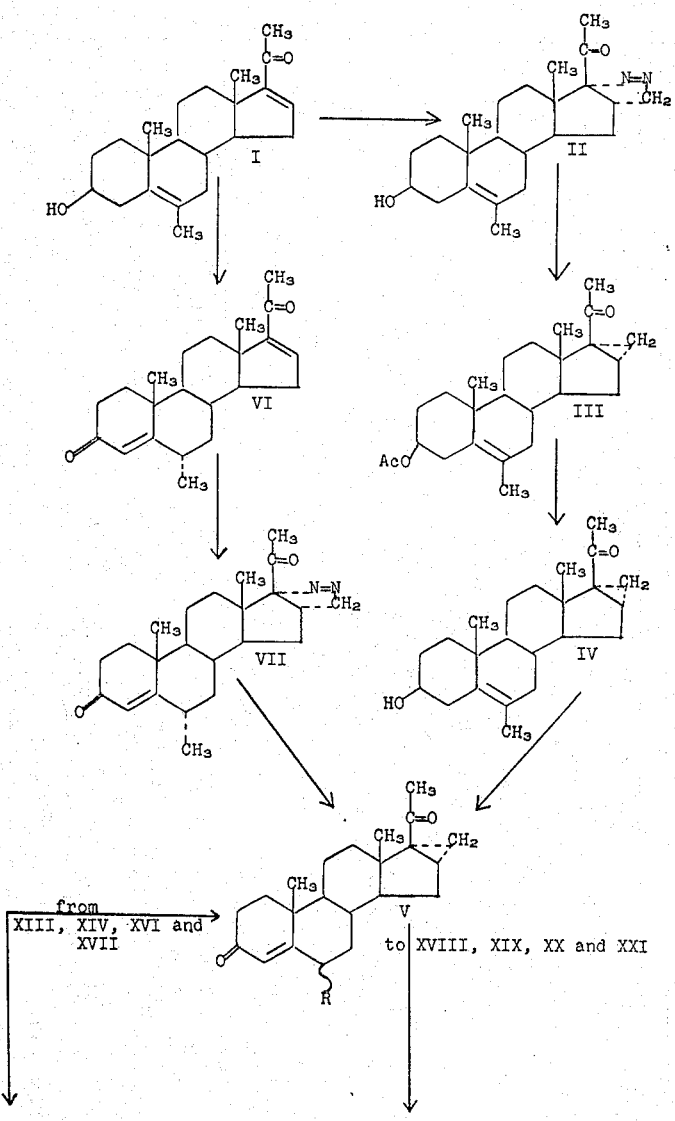

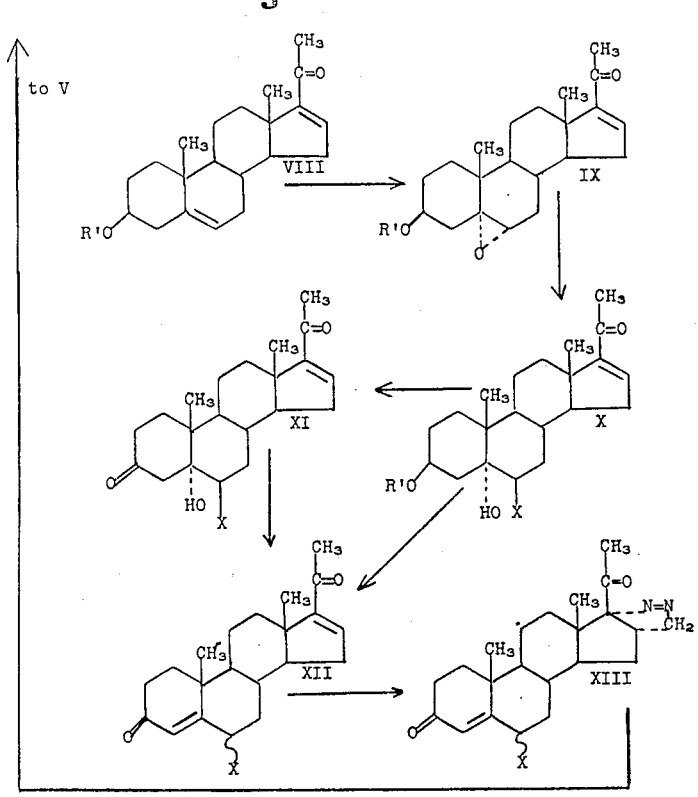
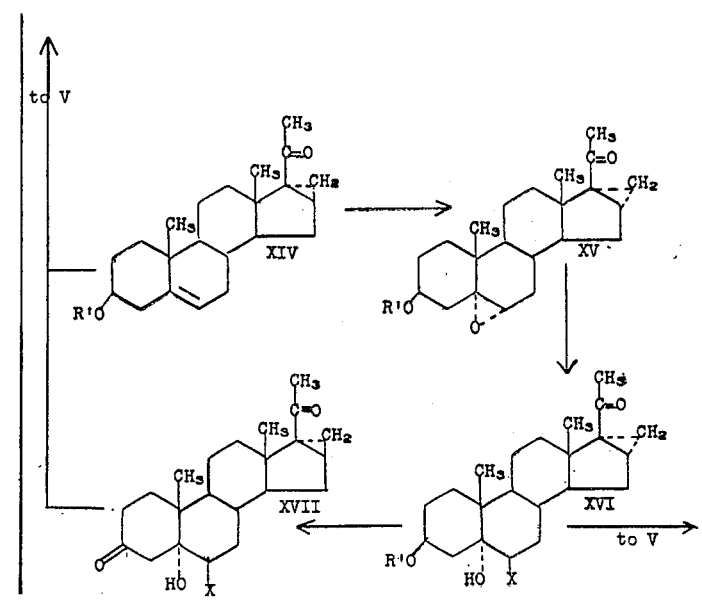

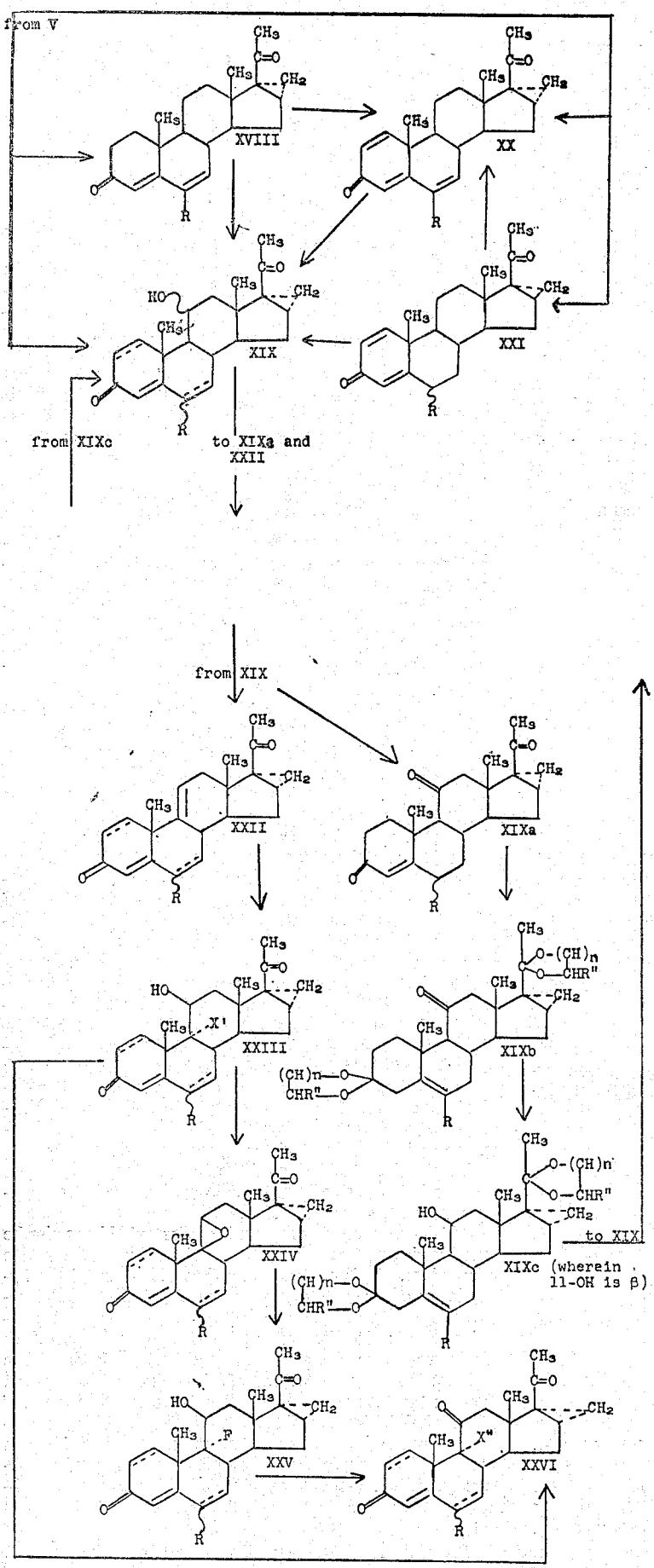

wherein R is selected from the group consisting of hydrogen, methyl, fluorine and chlorine; R' is selected from the group consisting of hydrogen and the acyl radical of an organic carboxylic acid, preferably a hydrocarbon carboxylic acid containing from one to twelve carbon atoms, inclusive; R" is hydrogen or lower-alkyl; n is an integer selected from the group consisting of one and two; X is chosen from the group consisting of fluorine and chlorine; X' is a halogen chosen from the group having an atomic weight from 35 to 127, inclusive, i.e., chlorine, bromine and iodine; X" is a halogen chosen from the group having an atomic weight from 19 to 127, inclusive, i.e., fluorine, chlorine, bromine and iodine; Ac is the acyl radical of an organic carboxylic acid, preferably a hydrocarbon carboxylic acid containing from one to twelve carbon atoms, inclusive; the broken lines appearing in Formula XIX and in Formulae XXII to XXVI, inclusive, represent $\Delta^1$ and $\Delta^6$-double bonds, which may or may not be present in each of the formulae and represent $\Delta^4$, $\Delta^{1,4}$, $\Delta^{4,6}$ and $\Delta^{1,4,6}$-compounds; $\sim$ is a generic expression denoting $\alpha$ and $\beta$ bonds and mixtures thereof.

The novel compounds of this invention and the intermediates therefor possess valuable pharmacological properties, particularly progestational, anti-estrogenic, gonadotropin inhibiting, and anti-inflammatory. The compounds represented by the formula

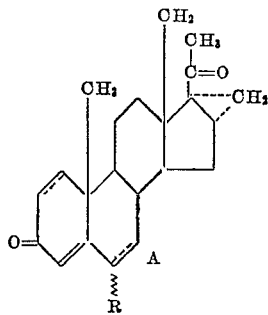

wherein R is selected from the group consisting of methyl, fluorine and chlorine and the broken lines represent $\Delta^1$ and $\Delta^6$-double bonds which may or may not be present and represent $\Delta^4$, $\Delta^{1,4}$, $\Delta^{4,6}$ and $\Delta^{1,4,6}$-compounds, are effective progestational agents which are useful in the treatment of functional uterine bleeding and dysmenorrhea; they are also advantageously employed either alone, or in combination with an androgen (e.g., 17-methyltestosterone, testosterone cyclopentylpropionate), or an estrogen (e.g., 17-ethinylestradiol 3-methyl ether, estradiol cyclopentylpropionate) in maintaining pregnancy and regulating fertility in valuable domestic animals. The compounds represented by the formula

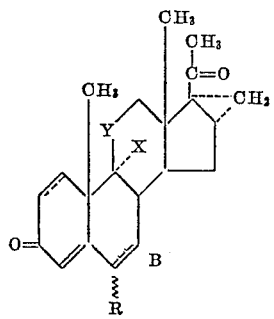

wherein R is selected from the group consisting of hydrogen, methyl, fluorine and chlorine, the broken lines are as in Formula A, above, X is selected from the group consisting of hydrogen, chlorine, bromine and fluorine and Y is selected from the group consisting of the β-hydroxymethylene radical

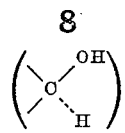

the α-hydroxymethylene radical and the carbonyl radical ($>$C=O), are effective progestational agents useful in the treatment of functional uterine bleeding and dysmenorrhea; their use is beneficial in the maintenance of pregnancy and regulation of fertility in valuable domestic animals. In addition, the compounds embraced by Formula B possess marked anti-inflammatory activity and are effective in the treatment of various inflammatory conditions of the skin, respiratory tract, bones and internal organs, contact dermatitis, rheumatoid arthritis and allergic reactions; the latter condition is especially responsive to topical application of the aforesaid compounds.

The compounds of Formulae A and B can be prepared and administered to mammals, birds, and animals in a wide variety of oral and parenteral dosage forms, singly, or in admixture with other coacting compounds. They can be associated with a carrier which can be a solid material or a liquid in which the compound is dissolved, dispersed or suspended. The solid compositions can take the form of tablets, powders, capsules, pills or the like, preferably in unit dosage forms for simple administration or precise dosage. The liquid compositions can take the form of solutions, emulsions, suspensions, syrups or elixirs.

The novel 16α,17α-methylene-6-substituted-progesterones (V) of the present invention are prepared by several processes, employing the routes and methods disclosed in (1) and (2), below.

(1) (a) 3β-hydroxy-6-methyl-5,16-pregnadiene-20-one (I) (prepared as in Example 11 of U.S. Patent 2,871,246) is reacted with diazomethane after the manner of Wettstein (Helv. Chim. Acta 27, 1803 [1944]) to produce the corresponding 16(17)-diazomethane adduct, 3β-hydroxy-6-methyl-16α:17α-(2¹:3¹-diazacyclopent - 2¹-eno)-pregn-5-en-20-one (II). The thus produced adduct (II) is decomposed by heating or by reaction with a strong acid, e.g., perchloric acid or boron trifluoride etherate, to produce 16α,17α - methylene-3β-hydroxy-6-methyl-5-pregnen-20-one; acylation of this compound, e.g., with the anhydride of a hydrocarbon carboxylic acid such as acetic anhydride, yields 16α,17α-methylene-3β-hydroxy-6-methyl-5-pregnen-20-one 3-acylate (III). The 3-acyl group of a compound represented by III is readily converted to 3β-hydroxy; thus, 16α,17α-methylene-3β-hydroxy-6-methyl-5-pregnen-20-one (IV) is prepared, e.g., by heating a compound of Formula III in methanol containing a strong mineral acid. Oxidation of the 3β-hydroxy group of the compound of IV, yields 16α,17α-methylene-6α-methyl-4-pregnene-3,20-dione (V).

(b) The 6-methyl compounds of Formula V can also be produced from the starting material (I) by an alternative procedure. This method comprises oxidation of the 3β-hydroxy group of 3β-hydroxy-6-methyl-5,16-pregnadiene-20-one (I) to produce 6α-methyl-4,16-pregnadiene-3,20-dione (VI); the thus produced Δ⁴-3-keto compound (VI) is converted to the corresponding 16(17)-diazomethane adduct (VII) by the method of Wettstein cited in (1) (a), above; the thus produced 16(17)-diazomethane adduct of 6α-methyl-4,16-pregnadiene-3,20-dione (VII) is decomposed by heating or by reaction with a strong acid, such as perchloric or boron trifluoride etherate, to yield, directly, 16α,17α - methylene-6α-methyl-4-pregnene-3,20-dione (V) and a byproduct, 6α,16-dimethyl-4,16-pregnadiene-3,20-dione (Va).

(2) (a) The compounds of Formula V, wherein R is fluorine or chlorine, are prepared from the known compounds of Formula VIII in accordance with the method of U.S. Patent 2,838,528. 3β-hydroxy-5,16-pregnadiene-20-one (VIII) or the corresponding 3-acylate thereof, is converted to 16-dehydro-3β-hydroxy or 3β-acyloxy-5α,6α-oxidopregnan-20-one (IX) with a peracid (e.g., performic, peracetic or perbenzoic); treating the compounds of Formula IX with hydrogen fluoride; hydrogen chloride or other fluorinating and chlorinating agents yield the corresponding 16-dehydro-3β,5α-dihydroxy-6β-fluoro (or chloro) pregnan-20-one (X) or the 3β-acylate thereof; the 3β-acylate is used, hydrolyzing the said 16-dehydro-6β-fluoro (or chloro)-3β-acyloxy-5α-hydroxypregnan-20-one (X) under acid conditions, for example with boron trifluoride or boron trichloride, yields 16-dehydro-6β-fluoro (or chloro)3β,5α-dihydroxypregnan-20-one (X); treating the 16-dehydro-6β-fluoro (or chloro)-3β,5α-dihydroxypregnan-20-one (X) with an oxidizing agent such as sodium dichromate in acetic acid gives 16-dehydro-5α-hydroxy-6β-fluoro (or chloro) pregnane-3,20-dione (XI); dehydrating the thus obtained 16-dehydro - 5α - hydroxy-6β-fluoropregnane - 3,20-dione (XI) with a base, or preferably with an acid, yields 6β-fluoro (or chloro)-4,16-pregnadiene-3,20-dione (16-dehydro - 6β - fluoro (or chloro) progesterone) (XII), which is isomerized by acid (or base) to the corresponding 6α-fluoro (or chloro) compound (XII). Oxidizing 16-dehydro-6β-fluoro - 3β,5α - dihydroxypregnan - 20-one (X) by the Oppenauer process produced 16-dehydro-6-fluoroprogesterone (XII) directly. The 6-halo compounds of Formula XII are converted to the 16(17)-diazomethane adducts of 6-fluoro (or chloro)-4,16-pregnadiene-3,20-dione (XIII) by the method of Wettstein cited in (1) (a), above; decomposition of the thus produced adducts (XIII) to yield 16α,17α-methylene-6α-fluoro (or chloro)-4-pregnene-3,20-dione (V) is carried out in the manner disclosed in (1) (a) or (1) (b), above.

(b) The compounds of Formula V, wherein R is fluorine or chlorine, can also be prepared by an alternative method that does not entail the production of the 16(17)-diazomethane adduct (XIII) of (2) (a), above. This process also utilizes the procedures of U.S. Patent 2,838,528 for the substitution of a fluoro (or chloro) atom at the 6-position of the steroid nucleus, but employs a starting material containing the 16α,17α-methylene group. By following the procedures disclosed in (2) (a), above, 16α,17α-methylene-3β-hydroxy (or acyloxy)-5-pregnen-20-one (XIV) (Ber. 93, 1714 [1960]) is converted to 16α,17α-methylene - 3β - hydroxy (or 3β-acyloxy)-5α,6α-oxidopregnan-20-one (XV); the compounds represented by Formula XV are transformed to 16α,17α-methylene-6β-fluoro (or chloro)-3β-hydroxy (or acyloxy)-5α-hydroxypregnan-20-one (XVI), which in turn are converted to 16α,17α-methylene-5α-hydroxy-6β-fluoro (or chloro)-pregnane-3,20-dione (XVII); dehydration of 16α,17α-methylene-5α-hydroxy-6β-fluoro (or chloro) pregnane-3,20-dione (XVII) yields, respectively, 16α,17α-6(α and β)-fluoro-4-pregnene - 3,20 - dione (16α,17α-methylene-6 (α and β)-fluoroprogesterone) (V) and 16α,17α-methylene-6α-chloroprogesterone (V).

The novel 16α,17α-methylene-6-substituted progesterones (V) of this invention are converted to the unsaturated derivatives thereof in accordance with the procedures well known in the steroid art. The compounds represented by Formula V when reacted with chloranil, in the manner disclosed in J. Amer. Chem. Soc. 79, 1257 (1957), yield the corresponding 16α,17α-methylene-6-substituted-6-dehydroprogesterones (XVIII), e.g., 16α,17α-methylene-6α-fluoro - 4,6 - pregnadiene - 3,20 - dione (XVIII). The Δ$^{4,6}$-compounds embraced by Formula XVIII can be dehydrogenated with selenium dioxide to give the corresponding Δ$^{1,4,6}$-compound (XX), e.g., 16α, 17α-methylene-6α-methyl - 1,4,6 - pregnatriene-3,20-dione (XX); preferably, they can be prepared by the 6-dehydrogenation of the corresponding Δ$^{1,4}$-compounds (XXI) by reaction with chloranil. The Δ$^{1,4,6}$-compounds (XX) can also be prepared directly from the Δ$^4$-compounds of Formula V by reaction with chloranil at elevated temperatures in accordance with the method also set forth in J. Amer. Chem. Soc. 79, 1257 (1957). The Δ$^{1,4}$-derivatives (XXI) of Formula V are produced by 1,2-dehydrogenation with selenium dioxide in the manner disclosed in U.S. Patent 2,971,886 and by dicyanodichlorobenzoquinone in the manner disclosed in British Patent 852,847; e.g., in this manner 16α,17α-methylene-6α-methyl-4-pregnene-3,20-dione (V) is converted to 16α,17α-methylene-6α-methyl - 1,4 - pregnadiene - 3,20-dione (XXI).

The novel 16α,17α-methylene compounds represented by Formulae V, XVIII, XX and XXI (and also embraced by Formula A, above), in addition to possessing valuable therapeutic properties, are useful as intermediates in the production of the corresponding 11-oxygenated compounds designated by Formulae XIX, XIXa, XXV and XXVI and embodied in Formula B, above. For example, a compound represented by Formulae V, XVIII, XX and XXI can be 11β- or 11α-hydroxylated with one of the many species of fungi known to oxygenate in that position, e.g., one from the order of Mucorales, Aspergillus, Penicillium, such as *Rhizopus nigricans*, *Curvularia luanta* or *Cunninghamella blakesleeana*, to produce a compound represented by Formula XIX.

An effective method of converting an 11α-hydroxy-4-pregnene compound of Formula XIX to the corresponding 11β-hydroxy epimer is readily available by adapting the procedures disclosed in U.S. Patent 2,968,655 for an analogous synthesis. In a similar manner, a 16α,17α-methylene-11α-hydroxy-4-pregnene (XIX) is converted to the corresponding 11-keto compound (XIXa) by oxidation, e.g., with chromic acid, chromic anhydride or N-bromoacetamide in pyridine, according to the usual procedures, well known in the steroid art; the thus produced 4-pregnenes of Formula (XIXa), e.g., 16α,17α-methylene-6-methyl-4-pregnene-3,11,20-trione (XIXa), 16α,17α-methylene-6-fluoro-4-pregnene - 3,11,20 - trione (XIXa), 16α,17α-methylene - 6 - chloro-4-pregnene-3,11,20-trione (XIXa) are diketalized, e.g., with ethylene glycol and p-toluenesulfonic acid to give, respectively, 16α,17α-methylene-6-methyl - 4 - pregnene-3,11,20-trione 3,20-bis (ethylene ketal) (XIXb), 16α,17α-methylene-6-fluoro-4-pregnene-3,11,20-trione 3,20-bis(ethylene ketal) (XIXb) and 16α,17α - methylene - 6 - chloro-4-pregnene-3,11,20-trione 3,20-bis(ethylene ketal) (XIXb); the compounds of Formula XIXb are reduced to their corresponding 11β-hydroxy analogues (XIXc), e.g., with lithium aluminum hydride; the compounds represented by Formula XIXc, such as 16α,17α-methylene-6-methyl-11β-hydroxy-4-pregnene-3,20-dione 3,20-bis(ethylene ketal) (XIXc), 16α,17α-methylene-6-fluoro - 11β - hydroxy - 4-pregnene-3,20-dione 3,20-bis(ethylene ketal) (XIXc), and 16α,17α-methylene-6-chloro - 11β - hydroxy-4-pregnene-3,20-dione 3,20-bis(ethylene ketal) (XIXc) are hydrolyzed, e.g., with a concentrated mineral acid such as sulfuric to yield, respectively, 16α,17α-methylene-6α-methyl-11β-hydroxy-4-pregnene-3,20-dione (XIX), 16α,17α-methylene-6α-fluoro-11β-hydroxy-4-pregnene - 3,20-dione (XIX) and 16α,17α-methylene-6α-chloro - 11β - hydroxy-4-pregnene-3,20-dione (XIX).

The 11α-hydroxy and 11β-hydroxy compounds represented by Formula XIX can be converted to their 11-keto counterparts (XIXa) by oxidation, e.g., with chromic anhydride or N-bromoacetamide in pyridine, according to usual procedures.

Both the 11α- and 11β-hydroxy compounds of Formula XIX can be converted in known manner to their corresponding 9α-fluoro derivatives (XXV) by the series of reactions disclosed in U.S. Patents 2,852,511, 2,923,722, 2,924,612 and 2,957,894. The methods described in the aforesaid patents involve dehydration of the 11-hydroxy group, e.g., with N-bromoacetamide and anhydrous sulfur dioxide in pyridine or via the p-toluenesulfonate ester, to produce the corresponding $\Delta^{9(11)}$-compounds (XXII) which are then treated with a hypohalous acid, e.g., N-bromoacetamide, N-chlorosuccinimide or N-iodosuccinimide, in the presence of aqueous perchloric acid, to produce the corresponding 9α-halo-11β-hydroxy compounds represented by Formula XXIII; reaction of the 16α,17α-methylene-9α-halo-11β-hydroxy compounds (XXIII) with a base, e.g., potassium acetate in acetone or sodium or potassium hydroxide in methanol, yields the corresponding 9β,11β-epoxides embraced by Formula XXIV; reaction of these 16α,17α-methylene-9β,11β-epoxides (XXIV) with anhydrous or aqueous hydrogen fluoride at below room temperature produce the corresponding 9α-fluoro-11β-hydroxy compounds represented by Formula XXV; the 16α,17α-methylene-9α-halo-11β-hydroxy compounds of Formulae XXV and XXIII can be oxidized to their corresponding 11-keto compounds (XXVI) with chromic acid or chromic anhydride. By following the above procedures, representative 16α,17α - methylene - 11β - hydroxy compounds of Formula XIX are converted to their 9α-fluoro counterparts (XXV). In this manner, 16α,17α-methylene-11β-hydroxy-4-pregnene-3,20-dione (XIX),
16α,17α-methylene-11β-hydroxy-6α-methyl-4-pregnene-3,20-dione (XIX),
16α,17α-methylene-11β-hydroxy-6α-fluoro-4-pregnene-3,20-dione (XIX),
16α,17α-methylene-11β-hydroxy-6α-methyl-1,4-pregnadiene-3,20-dione (XIX),
16α,17α-methylene-11β-hydroxy-6α-chloro-1,4-pregnadiene-3,20-dione (XIX),
16α,17α-methylene-11β-hydroxy-6-methyl-4,6-pregnadiene-3,20-dione (XIX),
16α,17α-methylene-11β-hydroxy-6-fluoro-4,6-pregnadiene-3,20-dione (XIX),
16,α17α-methylene-11β-hydroxy-1,4,6-pregnatriene-3,20-dione (XIX),
16α,17α-methylene-11β-hydroxy-6-methyl-1,4,6-pregnatriene-3,20-dione (XIX),
16α,17α-methylene-11β-hydroxy-6-fluoro-1,4,6-pregnatriene-3,20-dione (XIX) and
16α,17α-methylene-11β-hydroxy-6-chloro-1,4,6-pregnatriene-3,20-dione (XIX) yield, respectively,
16α,17α-methylene-9α-fluoro-11β-hydroxy-4-pregnene-3,20-dione (XXV),
16α,17α-methylene-9α-fluoro-6α-methyl-11β-hydroxy-4-pregnene-3,20-dione (XXV),
16α,17α-methylene-6α,9α-difluoro-11β-hydroxy-4-pregnene-3,20-dione (XXV),
16α,17α-methylene-9α-fluoro-6α-methyl-11β-hydroxy-1,4-pregnadiene-3,20-dione (XXV),
16α,17α-methylene-9α-fluoro-6α-chloro-11β-hydroxy-1,4-pregnadiene-3,20-dione (XXV),
16α,17α-methylene-9α-fluoro-6-methyl-11β-hydroxy-4,6-pregnadiene-3,20-dione (XXV),
16α,17α-methylene-6,9α-difluoro-11β-hydroxy-4,6-pregnadiene-3,20-dione (XXV),
16α,17α-methylene-9α-fluoro-11β-hydroxy-1,4,6-pregnadiene-3,20-dione (XXV),
16α,17α-methylene-9α-fluoro-6-methyl-11β-hydroxy-1,4,6-pregnatriene-3,20-dione (XXV),
16α,17α-methylene-9α-fluoro-6,9α-difluoro-11β-hydroxy-1,4,6-pregnatriene-3,20-dione (XXV) and
16α,17α-methylene-9α-fluoro-6-chloro-11β-hydroxy-1,4,6-pregnatriene-3,20-dione (XXV).

*Example 1.—16(17)-Diazomethane Adduct of 3β-Hydroxy-6-Methyl-5,16-Pregnadiene-20-One [3β-Hydroxy-6-Methyl-16α:17α-(2¹:3¹-Diazacyclopent-2¹-eno)-Pregn-5-En-20-One]* (II)

25 g. of N-methyl-N-nitroso-N'-nitroguanidine was added in small portions over a period of about 20 minutes to a stirred chilled mixture of 250 ml. of ether and 70 ml. of aqueous 50% potassium hydroxide. The ether layer was decanted and the water phase washed several times with small fresh portions of ether. The combined ether solutions of diazomethane thus prepared were diluted to about 400 ml. with ether and 25 g. of 3β-hydroxy-6-methyl-5,16-pregnadien-20-one (6 - methyl - 16 - dehydropregnenelone) (I) (prepared in the manner disclosed in Example 11 of U.S. Patent 2,871,246) added. After stirring for a period of about 6 hours at room temperature, the excess diazomethane of the reaction mixture was decomposed by dropwise addition of acetic acid. This solution was washed successively with water, dilute hydrochloric acid, dilute sodium bicarbonate and again with water. After drying over magnesium sulfate, the solvent was removed leaving a crystalline residue. This product was triturated with acetone and then recrystallized from acetone to yield 7.8 g. of material with a melting point of 184 to 187° C. (with bubbling). A small amount of the product was recrystallized to give the pure 16(17)-diazomethane adduct of 3β-hydroxy-6-methyl-5,16-pregnadien-20-one, [3β-hydroxy-6-methyl-16α:17α-(2¹:3¹-diazacyclopent-2¹-eno)-pregn-5-en-20-one] (II) melting at 175 to 180° C. and a rotation $[\alpha]_D$ of +21° (chloroform).

*Analysis.*—Calcd. for $C_{23}H_{34}O_2N_2$: C, 74.55; H, 9.25; N, 7.56. Found: C, 74.31; H, 9.02; N, 7.82.

*Example 2.—16α,17α-Methylene-3β-Hydroxy-6-Methyl-5-Pregnen-20-One 3-Acetate (III)*

1 ml. of boron trifluoride etherate was added to a slurry (cooled in an ice bath) of 2 g. of the diazomethane adduct of 3β-hydroxy-6-methyl-5,16-pregnadien-20-one (II) in 10 ml. of acetone. The solution became clear in a few minutes; after a period of about 30 minutes it was poured into water and extracted with methylene chloride. The extract was washed successively with water, dilute sodium hydroxide solution, again with water and dried. The solvent was removed from the extract leaving a yellow non-crystalline residue. The residue was dissolved in 5 ml. of pyridine and 3 ml. of acetic anhydride added to give a blood-red solution. This solution was warmed to about 50° C. for a period of about 30 minutes, poured into water and extracted with methylene chloride. The extract was washed successively with dilute hydrochloric acid, dilute sodium hydroxide and water. It was then dried and poured onto a 150 g. column of Florisil (synthetic magnesium silicate) packed wet with Skellysolve B (hexanes). The intense color of the methylene chloride extract was absorbed in the first two inches of the column. Gradient elution with mixtures of 5 l. of 2% acetone-Skellysolve B, 5 l. of 10% acetone-Skellysolve B (400 ml. portions) gave crystalline residues in fractions 4 and 5. These fractions were combined and recrystallized from aqueous methanol to yield 20 mg. of 16α,17α-methylene-3β-hydroxy-6-methyl-5-pregnen-20-one 3 - acetate (III) with a melting point of 136 to 141° C. The infrared spectrum of the compound shows absorption (C=) at 1733 and 1675 cm.⁻¹ and (C=O) at 1240 cm.⁻¹. Neither terminal methylene nor $\Delta^{16}$-methyl absorptions were observed.

*Analysis.*—Calcd. for $C_{25}H_{36}O_3$: C, 78.08; H, 9.44. Found: C, 78.74; H, 9.70.

*Example 3.—16α,17α-Methylene-3β-Hydroxy-6-Methyl-5-Pregnen-20-One (IV)*

0.5 gm. of 16α,17α-methylene-3β-hydroxy-6-methyl-5-pregnen-20-one 3-acetate (III) in 20 ml. of methanol and 0.15 ml. of concentrated hydrochloric acid is refluxed for a period of about 1 hour. About half of the methanol is evaporated under a stream of nitrogen. The product is flooded out with water, collected, dried and recrystallized from acetone to yield 16α,17α - methylene - 3β - hydroxy-6-methyl-5-pregnen-20-one (IV).

*Example 4.—16α,17α - Methylene-6α-Methyl-4-Pregnene-3,20-Dione (16α,17α-Methylene - 6α - Methylprogesterone) (V)*

A solution of 5 g. of 16α,17α-methylene-3β-hydroxy-6-methyl-5-pregnen-20-one (IV) in 15 ml. of cyclohexanone and 35 ml. of toluene is boiled for a few minutes to remove any traces of water and then 2.5 g. of aluminum isopropoxide added. This solution is stirred under reflux for a period of about 35 minutes, cooled, diluted with a little methylene chloride and then washed successively with dilute sodium hydroxide, salt water, dilute hydrochloric acid and then twice with salt water. The solution is dried and then chromatographed on a 200 g. column of Florisil. The product is eluted with mixtures comprising Skellysolve B containing 6 to 8% of acetone; recrystallization from a mixture of hexanes and acetone yields light-colored, crystalline 16α,17α - methylene - 6α-methyl-4-pregnene-3,20 dione (V).

*Example 4A.—16α,17α-Methylene-4-Pregnene-3,20-Dione (16α,17α-Methyleneprogesterone) (V)*

Following the procedure of Example 4, but substituting 16α,17α - methylene-3β-hydroxy-5-pregnen-20-one (XIV) (Ber. 93, 1714 [1960]) as starting material, yields 16α,17α-methylene-4-pregnene-3,20-dione (V).

*Example 5.—6α-Methyl-4,16-Pregnadiene-3,20-Dione (6α-Methyl-16-Dehydroprogesterone) (VI)*

A solution of 5 g. of 3β-hydroxy-6-methyl-5,16-pregnadien-20-one (I) in 15 ml. of cyclohexanone and 35 ml. of toluene is boiled for a few minutes to remove any traces of water and then 2.5 g. of aluminum isopropoxide added. This solution is stirred under reflux for a period of about 35 minutes, cooled, diluted with a little methylene chloride and then washed successively with dilute sodium hydroxide, salt water, dilute hydrochloric acid and then twice with salt water. The solution is dried and then chromatographed on a 200 g. column of Florisil. The product is eluted with mixtures comprising Skellysolve B containing 6 to 8% of acetone; recrystallization from a mixture of hexanes and acetone yields light-colored, crystalline 6α-methyl-4,16-pregnadiene-3,20-dione (VI).

Following the procedure of Example 5, but employing 3β-hydroxy-5,16-pregnadien-20-one as starting material, yields 4,16-pregnadien-3,20-dione.

*Example 6.—16(17)-Diazomethane Adduct of 6α-Methyl-4,16 - Pregnadiene - 3,20 - Dione [6α-Methyl-16α:17α-(2¹:3¹ - Diazacyclopent - 2¹ - Eno) - Pregn-4-Ene-3:20-Dione] (VII)*

27.5 g. of N-methyl-N-nitroso-N′-nitroguanidine was added in small portions over a period of about 20 minutes to a stirred chilled mixture of 270 ml. of ether and 75 ml. of aqueous 50% potassium hydroxide. The ether layer was decanted and the water phase washed several times with small fresh portions of ether. The combined ether solutions of diazomethane thus prepared was diluted to about 500 ml. with ether and 20 g. of 6α-methyl-4,16-pregnadiene-3,20-dione (6α-methyl-16-dehydroprogesterone) (VI) added. After stirring at room temperature for about 18 hours, the excess diazomethane was decomposed by dropwise addition of acetic acid. The reaction mixture was washed with water and dried. After removal of the solvent, the residue was triturated with ether and crystallized from acetone to give 12.2 g. of the product melting at 159 to 162° C. (decomposition). Two further crystallizations from acetone yielded the pure product, the 16(17)-diazomethane adduct of 6α-methyl-4,16-pregnadiene-3,20-dione [6α-methyl-16α:17α - (2¹:3¹-diazacyclopent - 2¹ - eno)-pregn-4-ene-3:20-dione] (VII) with a melting point of 159 to 162° C. (decomposition), rotation [α]$_D$ of +137 (chloroform) and $$\lambda_{max.}^{alcohol} \ 239 \ m\mu \ (\epsilon = 16,950)$$

*Analysis.*—Calcd. for $C_{23}H_{32}O_2N_2$: C, 74.96; H, 8.75; N, 7.60. Found: C, 75.06; H, 9.28; N, 7.88.

Following the procedure of Example 6, but substituting 4,16-pregnadiene-3,20-dione as starting material, yields the 16(17)-diazomethane adduct of 4,16-pregnadiene-3,20-dione.

*Example 7.—16α,17α - Methylene-6α-Methyl-4-Pregnene-3,20-Dione (16α,17α - Methylene-6α-Methylprogesterone) (V) and 6α,16-Dimethyl-4,16-Pregnadiene - 3,20-Dione (6α,16-Dimethyl-16-Dehydroprogesterone) (Va)*

1 g. of the 16(17)-diazomethane adduct of 6α-methyl-4,16-pregnadiene-3,20-dione (VII) was added in portions to a solution of 0.4 ml. of 70% perchloric acid in 21 ml. of acetone at a temperature of about 50° C. Several minutes after the addition of the last portion, the solution was cooled, poured into ice-water and extracted with methylene chloride. The extract was successively washed with water, dried, filtered and chromatographed on a 200 g. column of Florisil packed wet with Skellysolve B. Gradient elution with 5 l. of 2% acetone in Skellysolve B and 5 l. of 8% acetone in Skellysolve B (400 ml. fractions collected) gave the desired cyclopropane in fractions 15 to 19. These fractions were combined and recrystallized from a mixture of acetone and Skellysolve B to yield 0.43 g. of product melting at 136 to 139.5° C. Another recrystallization from the same pair of solvents gave 0.35 g. of 16α,17α-methylene-6α-methyl-4-pregnene-3,20-dione (V) with a melting point of 138 to 140° C., rotation [α]$_D$ of +188° (chloroform), $$\lambda_{max.}^{alcohol} \ 241 \ m\mu \ (\epsilon = 16,350)$$

and a negative tetranitromethane test.

*Analysis.*—Calcd. for $C_{23}H_{32}O_2$: C, 81.13; H, 9.47. Found: C, 81.47; H, 9.57.

Fractions 21 to 26 contained the Δ$^{16}$-16-methyl product and were combined and recrystallized three times from a mixture of acetone and Skellysolve B to yield 30 mg. of 6α,16-dimethyl-4,16-pregnadiene-3,20-dione (Va) with a melting point of 189 to 192° C., $$\lambda_{max.}^{alcohol} \ 243.5 \ m\mu \ (\epsilon = 23,845)$$

and a positive tetranitromethane test.

*Analysis.*—Calcd. for $C_{23}H_{32}O_2$: C, 81.13; H, 9.47. Found: C, 81.27; H, 9.45.

*Example 8. — 16 - Dehydro - 3β-Hydroxy-5α,6α-Oxidopregnan - 20 - One (16 - Dehydro-5α,6α-Oxidopregnenelone) (IX)*

A reaction mixture comprising 20 g. of the known compound 16-dehydropregnenelone (3β-hydroxy-5,16-pregnadiene-20-one) (VIII), 4 g. of anhydrous sodium acetate, and 20 ml. of 40% peracetic acid in 400 ml. of chloroform is stirred 2 hours at a temperature between about 0° to 4° C. The reaction mixture is then washed with water and aqueous sodium bicarbonate and evaporated to near dryness. The residue thus obtained is crystallized from a mixture of methylene chloride and acetone to give the desired product. Recrystallization from the same solvent pair yields crystalline 16-dehydro-3β-hydroxy-5α,6α-oxidopregnan-20-one (IX).

*Example 9. — 16 - Dehydro - 3β-Acetoxy-5α,6α-Oxidopregnan - 20-One (16 - Dehydro-5α,6α-Oxidopregnenelone 3β-Acetate (IX)*

16-dehydropregnenelone 3β-acetate (3β-acetoxy-5,16-pregnadiene-20-one) (VIII) is treated with peracetic acid in the same manner as described in Example 8 to give 16-dehydro-3β-acetoxy-5α,6α-oxidopregnan-20-one (IX).

Alternatively, 16-dehydro-3β-acetoxy-5α,6α-oxidopregnan-20-one (IX) is obtained in nearly quantitative yield by treating 16-dehydro-3β-hydroxy-5α,6α-oxidopregnan-20-one (IX) (from Example 8) with acetic anhydride in pyridine.

Similarly, other 3β-esters of 16-dehydro-3β-hydroxy-5α,6α-oxidopregnan-20-one (IX) are prepared by treating the corresponding unesterified 3β-hydroxy compound in pyridine solution with the anhydride or acyl halides of organic carboxylic acids, particularly hydrocarbon carboxylic acids containing from one to twelve carbon atoms, inclusive. Representative 3β-esters thus prepared include in particular, the propionate, butyrate, isobutyrate, valerate, isovalerate, hexanoate, heptanoate, octanoate, benzoate, phenylacetate, phenylpropionate, propiolate, crotonate, β-cyclopentylpropionate, tertiary butylacetate, toluate, 2-furoate, benzenesulfonate, toluenesulfonate, and the like of 16-dehydro-3β-hydroxy-5α,6α-oxidopregnan-20-one (IX).

*Example 10.—16-Dehydro-6β-Fluoro-3β-Acetoxy-5α Hydroxypregnan-20-One (X)*

In a fifty ml. polyethylene bottle cooled with a Dry Ice-acetone mixture is placed 6.9 g. of anhydrous hydrogen fluoride, followed by slow addition of 5 ml. of chilled chloroform (stabilized with a trace of alcohol) and 13.24 ml. of tetrahydrofuran. To this is added 4 g. of 16-dehydro-3β-acetoxy-5α,6α-oxidopregnan-20-one (IX) in 25 ml. of chilled chloroform giving a violet solution which was kept for two hours at —10° C., then poured into excess aqueous sodium bicarbonate with stirring. The thus obtained mixture is extracted with methylene chloride and the methylene chloride solution was washed with water and evaporated to dryness. The residue thus obtained is crystallized from methylene chloride-ethyl acetate mixture to yield light-colored crystalline 16-dehydro-6β-fluoro-3β-acetoxy-5α-hydroxypregnan-20-one (X).

Similar results are obtained using smaller amounts of hydrogen fluoride as shown in the following procedure.

A mixture of 0.60 g. of anhydrous hydrogen fluoride and 2.80 g. of 16-dehydro-3β-acetoxy-5α,6α-oxidopregnan-20-one (IX) in 24 ml. of methylene chloride is kept for about four hours at room temperature, then 0.6 ml. of pyridine is added and the mixture is evaporated to dryness. The thus obtained residue is triturated with ether to give crystalline 16-dehydro-6β-fluoro-3β-acetoxy-5α-hydroxypregnan-20-one (X).

*Example 11.—16-Dehydro-6β-Chloro-3β-Acetoxy-5α-Hydroxypregnan-20-One (X)*

A slow stream of gaseous hydrogen chloride is passed through a solution of 4 g. of 16-dehydro-3β-acetoxy-5α,6α-oxidopregnan-20-one (IX) in 50 ml. of ice-cold methylene chloride for a period of about 1 hour. The resulting solution is allowed to stand at room temperature for a period of about 4 hours then neutralized with pyridine. The methylene chloride is removed by evaporation and to the slurry thus obtained, water is added. The mixture thus obtained is filtered and the solid material remaining is washed thoroughly with water. The solid material is then recrystallized from acetone to yield light-colored, crystalline 16-dehydro-6β-chloro-3β-acetoxy-5α-hydroxypregnan-20-one (X).

*Example 12.—16-Dehydro-6β-Fluoro-3β,5α-Dihydroxy-pregnan-20-One (X)*

A mixture of 7.3 g. of anhydrous hydrogen fluoride in 5 ml. of chloroform and 14 ml. of tetrahydrofuran is cooled in a Dry Ice-acetone bath and a solution of 4 g. of 16 - dehydro - 3β-hydroxy-5α,6α-oxidopregnan-20-one (IX) in 25 ml. of chloroform is added. This reaction mixture is kept at —10° C. for about 2.5 hours and is then poured into excess aqueous sodium bicarbonate solution. The resulting mixture is extracted with methylene chloride and the methylene chloride extract washed with water and evaporated to give a solid residue, which is recrystallized from methanol-ethyl acetate mixture to give 16 - dehydro-6β-fluoro-3β,5α-dihydroxy-pregnan-20-one (X).

In an alternative method of preparation, a mixture of 100 mg. of 16-dehydro-6β-fluoro-3β-acetoxy-5α-hydroxypregnan-20-one (X) from Example 10, 2.5 ml. of methanol and 0.1 ml. of boron trifluoride-etherate is heated under reflux for about fifteen minutes, then is concentrated to 1 ml. and diluted with water to give 75 milligrams of a precipitate consisting of crude 16-dehydro-6β-fluoro-3β,5α-dihydroxy-pregnan-20-one (X).

*Example 13.—16 - Dehydro-6β-Chloro-3β,5α-Dihydroxypregnan-20-One (X)*

A solution of 6 g. of 16-dehydro-3β-hydroxy-5α,6α-oxidopregnan-20-one (IX) (prepared as in Example 8) in 50 ml. of chloroform is cooled in an ice-salt bath and saturated with gaseous hydrogen chloride. After a period of about one hour, the reaction mixture is purged with nitrogen. The reaction mixture is then washed with water, dilute sodium carbonate solution and again with water and then dried over magnesium sulfate. The solvent is evaporated leaving an amorphous residue of 16-dehydro - 6β-chloro-3β,5α-dihydroxypregnan-20-one (X) which retained chloroform is a solvated form. This residue can be used without further purification in Example 15.

If desired, by drying at 60° C. to 100° C. under reduced pressure, the chloroform solvate of 16-dehydro-6β-chloro-3β,5α-dihydroxypregnan-20-one (X), described above, is converted to 16-dehydro-6β-chloro-3β,5α-dihydroxypregnan-20-one (X).

*Example 14.—16-Dehydro-5α-Hydroxy-6β-Fluoropregnane-3,20-Dione (XI)*

One gram of 16-dehydro-3β,5α-dihydroxy-6β-fluoropregnan-20-one (X) is added to 25 ml. of acetic acid and immediately 1 g. of sodium dichromate dihydrate dissolved in 10 ml. of acetic acid is added while the reaction mixture is stirred and cooled in a cold water bath. The reaction mixture is allowed to stand about 18 hours at room temperature, then 2 ml. of methanol is added to destroy excess oxidant and the reaction mixture is poured into water to give crystalline 16-dehydro-5α-hydroxy-6β-fluoropregnane-3,20-dione (XI).

*Example 15.—16-Dehydro-5α-Hydroxy-6β-Chloropregnane-3,20-Dione (XI)*

To the residue of 16-dehydro-6β-chloro-3β,5α-dihydroxypregnan-20-one (X) from Example 13, 6 g. of sodium dichromate in 60 ml. of acetic acid is added with cooling in a cold water bath. The thus obtained solution is allowed to stand without further cooling for about 2 hours and yields a precipitate. The thus formed precipitate is collected, first washed with acetic acid, then ether and dried. The thus obtained residue is recrystallized from ethyl acetate-acetone to yield light-colored, crystalline 16 - dehydro - 5α - hydroxy - 6β - chloropregnane-3,20-dione (XI).

*Example 16.—6β - Fluoro - 4,16 - Pregnadiene - 3,20-Dione and 6α-Fluoro-4,16-Pregnadiene-3,20-Dione (16-Dehydro-6β-Fluoroprogesterone and 16-Dehydro-6α-Fluoroprogesterone) (XII)*

Two grams of 16-dehydro-5α-hydroxy-6β-fluoropregnane-3,20-dione (XI) is suspended in 200 milliliters of chloroform (containing 0.75 percent alcohol) at room temperature and anhydrous hydrogen chloride gas passed through the mixture for about thirty minutes. After two minutes, a pale yellow solution is obtained. Following the hydrogen chloride treatment, a stream of nitrogen is passed through the solution for about fifteen minutes, and the solution is then washed with cold water and with five percent aqueous sodium bicarbonate. The thus obtained chloroform solution is evaporated and gives as residue a pale glass. The crude mixture is placed on 80 g. of Florisil (synthetic magnesium silicate) and eluted with 250-milliliter fractions of acetone in petroleum ether (thirty to sixty degrees). With four to five percent acetone, a mixture of 16-dehydro-6α-fluoroprogesterone (XII) and 16-dehydro-6β-fluoroprogesterone (XII) is obtained which on fractional crystallization from a mixture of ether and Skellysolve B hexanes gives pure 16-dehydro-6β-fluoroprogesterone (XII), and 16-dehydro-6α-fluoroprogesterone (XII).

*Example 17.—16-Dehydro-6β-Fluoroprogesterone (XII)*

Two grams of 16-dehydro-5α-hydroxy-6β-fluoropregnane-3,20-dione (XI) suspended in 400 ml. of 95 percent ethanol containing nine drops of concentrated hydrochloric acid is refluxed for about fifteen minutes, and 100 ml. of dioxane and six drops of concentrated hydrochloric acid are then added and the starting material dissolved. The solution is heated at reflux for about two and one-half hours, and aliquots are taken which show by melting points that practically no dehydration occurs. One ml. of concentrated hydrochloric acid is then added to the reaction mixture and refluxing is continued for about an additional three and one-half hours. The mixture is then concentrated to one-half volume by evaporation under diminished pressure, diluted with 100 ml. of water, and further concentrated until crystallization occurs, giving a mixture which on fractional crystallization from a mixture of methylene chloride and methanol gives crystalline 16-dehydro-6β-fluoroprogesterone (XII).

*Example 18.—16-Dehydro-6α-Fluoroprogesterone (XII) From 16-Dehydro-6β-Fluoroprogesterone (XII)*

A solution of 16-dehydro-6β-fluoroprogesterone (XII) in a mixture of ethanol and aqueous hydrogen chloride is heated under reflux for about thirty minutes, and the mixture is then poured into a large excess of water and the precipitated material collected by filtration and recrystallized to give pure 16-dehydro-6α-fluoroprogesterone (XII).

*Example 19.—6α-Chloro-4,16-Pregnadiene-3,20-Dione (16-Dehydro-6α-Chloroprogesterone) (XII)*

A solution of 4 g. of 16-dehydro-5α-hydroxy-6β-chloropregnane-3,20-dione (XI) (prepared in the manner disclosed in Example 15) in 50 ml. of chloroform and 0.5 ml. of absolute ethanol is cooled in an ice-salt bath and saturated with gaseous hydrogen chloride. After a period of about 3 hours, the reaction mixture is removed from the cooling bath and purged with nitrogen. The reaction mixture is washed with water, then dilute aqueous sodium bicarbonate solution, dried over magnesium sulfate and the solvent evaporated to give a residue. The thus obtained residue is then crystallized twice from a mixture of acetone and Skellysolve B to yield 16-dehydro-6α-chloroprogesterone (XII).

*Example 20.—16(17)-Diazomethane Adduct of 6α-Fluoro-4,16-Pregnadiene-3,20-Dione [6α-Fluoro-16α: 17α - ($2^1$:$3^1$ - Diazacyclopent - $2^1$ - Eno) - Pregn - 4 - Ene-3:20-Dione] (XIII)*

An ether solution of diazomethane (prepared in the manner described in Example 6) is diluted to about 500 ml. with ether and 20 g. of 6α-fluoro-4,16-pregnadiene-3,20 - dione (16 - dehydro - 6α - fluoroprogesterone) (XII) (produced in the manner disclosed in Examples 16 or 18) added. After stirring at room temperature for about 18 hours, the excess diazomethane is decomposed by dropwise addition of acetic acid. The reaction mixture is washed with water and dried. After removal of the solvent, the residue is triturated with ether and crystallized from acetone to give the 16(17)-diazomethane adduct of 6α-fluoro-4,16-pregnadiene-3,20-dione [6α-fluoro - 16α:17α - ($2^1$:$3^1$ - diazacyclopent - $2^1$ - eno)-pregn-4-ene-3:20-dione] (XIII).

Following the procedure of Example 20, but employing 6β-fluoro-4,16-pregnadiene-3,20-dione (XII) (produced in the manner disclosed in Example 17) as starting material, yields the 16(17)-diazomethane adduct of 6β-fluoro-4,16-pregnadiene-3,20-dione (XIII).

*Example 21.—16(17)-Diazomethane Adduct of 6α-Chloro-4,16-Pregnadiene-3,20-Dione [6α-Chloro-16α: 17α - ($2^1$:$3^1$ - Diazacyclopent - $2^1$ - Eno - Pregn - 4 - Ene-3:20-Dione] (XIII)*

Following the procedure of Example 20, but substituting 6α-chloro-4,16-pregnadiene-3,20-dione (XII) (produced in the manner disclosed in Example 19) as starting material, yields the 16(17)-diazomethane adduct of 6α-chloro-4,16-pregnadiene-3,20-dione (XIII).

*Example 22.—16α,17α-Methylene-6α-Fluoro-4-Pregnene-3,20 - Dione (16α,17α - Methylene - 6α - Fluoroprogesterone) (V)*

1 g. of the 16(17)-diazomethane adduct of 6α-fluoro-4,16-pregnadiene-3,20-dione (XIII) is added in portions to a solution of 0.4 ml. of 70% perchloric acid in 20 ml. of acetone at a temperature of about 50° C. Several minutes after addition of the last portion, the solution is cooled, poured into ice water and extracted with methylene chloride. The extract is successively washed with water, dried, filtered and chromatographed on a 200 g. column Florisil packed wet with Skellysolve B. Gradient elution with 5 l. of 2% acetone in Skellysolve B and 5 l. of 8% acetone in Skellysolve B (400 ml. fractions collected) gives the desired cyclopropane product. The fractions containing this product are combined and recrystallized from a mixture of acetone and Skellysolve B to yield pure crystalline 16α,17α-methylene-6α-fluoro-4-pregnene-3,20-dione (V).

Following the procedure of Example 22, but employing the 16(17)-diazomethane adduct of 6β-fluoro-4,16-pregnadiene-3,20-dione (XIII) (produced in the manner disclosed in Example 20) as starting material, yields crystalline 16α,17α-methylene - 6β - fluoro-4-pregnene-3,20-dione (V).

*Example 23.—16α,17α-Methylene-6α-Chloro-4-Pregnene-3,20-Dione (16α,17α-Methylene - 6α - Chloroprogesterone) (V)*

Following the procedure of Example 22, but substituting the 16(17)-diazomethane adduct of 6α-chloro-4,16-pregnadiene-3,20-dione (XIII) (from Example 21) as starting material, yields crystals of 16α,17α-methylene-6α-chloro-4-pregnene-3,20-dione (V).

*Example 24.—16α,17α-Methylene - 3β - Hydroxy-5α,6α-Oxidopregnan - 20 - One (16α,17α - Methylene-5α,6α-Oxidopregnenelone (XV)*

A reaction mixture comprising 20 g. of 16α,17α-methylene-3β-hydroxy-5-pregnen-20-one (16α,17α-methylenepregnenelone) (XIV) (Ber. 93, 1714 [1960]), 4 g. of anhydrous sodium acetate and 20 ml. of 40% peracetic acid in 400 ml. of chloroform is stirred 2 hours at a temperature between about 0° to 4° C. The reaction mixture is then washed with water and aqueous sodium bicarbonate and evaporated to near dryness. The thus obtained residue is crystallized from a mixture of methylene chloride and acetone to give the desired product. Recrystallization from the same solvent pair yields 16α,17α-methylene-3β-hydroxy - 5α,6α - oxidopregnan-20-one (XV).

*Example 25.—16α,17α - Methylene - 3β - Acetoxy-5α,6α-Oxidopregnan- - 20 - One (16α,17α - Methylene-5α,6α-Oxidopregnenelone 3β-Acetate) (XV)*

16α,17α-methylene - 3β - acetoxy - 5 - pregnen-20-one (16α,17α-methylenepregnenelone 3β-acetate) (XIV) (Ber. 93, 1714 [1960]) is treated with peracetic acid in the same manner as described in Example 24 to give 16α,17α-methylene-3β-acetoxy-5α,6α-oxidopregnan-20-one (XV).

Alternatively, 16α,17α-methylene - 3β - acetoxy-5α,6α-oxidopregnan-20-one (XV) is obtained in nearly quantitative yield by treating 16α,17α-methylene-3β-hydroxy- 5α,6α-oxidopregnan-20-one (XV) (from Example 24) with acetic anhydride in pyridine.

Similarly, other 3β-esters of 16α,17α-methylene-3β-hydroxy-5α,6α-oxidopregnan-20-one (XV) are prepared by treating the corresponding unesterified 3β-hydroxy compound in pyridine solution with the anhydride or acyl halides or organic carboxylic acids, particularly hydrocarbon carboxylic acids containing from one to twelve carbon atoms, inclusive. Representative 3β-esters thus prepared include in particular, the propionate, butyrate, isobutyrate, valerate, isovalerate, hexanoate, heptanoate, octanoate, benzoate, phenylacetate, phenylpropionate, propiolate, crotonate, β-cyclopentylpropionate, tertiary butylacetate, toluate, 2-furoate, benzenesulfonate, toluenesulfonate, and the like of 16α,17α-methylene-3β-hydroxy-5α,6α-oxidopregnan-20-one (XV).

*Example 26.—16α,17α-Methylene-6β-Fluoro-3β-Acetoxy-5α-Hydroxypregnan-20-One (XVI)*

Following the procedure of Example 10, but substituting 16α,17α - methylene-3β-acetoxy-5α,6α-oxidopregnan-20-one (XV) (from Example 25) as starting material, yields crystalline 16α,17α-methylene-6β-fluoro-3β-acetoxy-5α-hydroxy-pregnan-20-one (XVI).

*Example 27.—16α,17α-Methylene-6β-Chloro-3β-Acetoxy-5α-Hydroxypregnan-20-One (XVI)*

Following the procedure of Example 11, but substituting 16α,17α - methylene-3β-acetoxy-5α,6α-oxidopregnan-20-one (XV) (from Example 25) as starting material, yields light-colored, crystalline 16α,17α-methylene-6β-chloro-3β-acetoxy-5α-hydroxypregnan-20-one (XVI).

*Example 28.—16α,17α-Methylene - 6β - Fluoro-3β,5α-Dihydroxypregnan-20-One (XVI)*

Following the procedure of Example 12, but substituting 16α,17α-methylene-3β-hydroxy-5α,6α-oxidopregnan-20-one (XV) (from Example 24) as starting material, yields light-colored crystals of 16α,17α-methylene-6β-fluoro-3β,5α-dihydroxypregnan-20-one (XVI).

*Example 29.—16α,17α-Methylene - 6β - Chloro-3β,5α-Dihydroxypregnan-20-One (XVI)*

Following the procedure of Example 13, but substituting 16α,17α-methylene-3β-hydroxy-5α,6α-oxidopregnan-20-one (XV) (from Example 24) as starting material, yields 16α,17α - methylene - 6β - chloro-3β,5α-dihydroxypregnan-20-one (XVI).

*Example 30.—16α,17α-Methylene-5α-Hydroxy-6β-Fluoropregnane-3,20-Dione (XVII)*

Following the procedure of Example 14, but substituting 16α,17α-methylene - 6β - fluoro-3β,5α-dihydroxypregnan-20-one (XVI) (from Example 28) as starting material, yields crystalline 16α,17α-methylene-5α-hydroxy-6β-fluoro-pregnane-3,20-dione (XVII).

*Example 31.—16α,17α - Methylene-5α-Hydroxy-6β-Chloropregnane-3,20-Dione (XVII)*

Following the procedure of Example 15, but substituting 16α,17α-methylene - 6β - fluoro-3β,5α-dihydroxypregnan-20-one (XVI) (from Example 29) as starting material, yields light-colored, crystalline 16α,17α-methylene-5α-hydroxy-6β-chloropregnane-3,20-dione (XVII).

*Example 32.—16α,17α-Methylene-6β-Fluoro-4-Pregnene-3,20-Dione and 16α,17α-Methylene-6α-Fluoro-4-Pregnene-3,20-Dione (16α,17α-Methylene-6β-Fluoroprogesterone and 16α,17α-Methylene-6α-Fluoroprogesterone) (V)*

Following the procedure of Example 16, but substituting 16α,17α-methylene - 5α - hydroxy-6β-fluoropregnane-3,20-dione (XVII) (from Example 30) as starting material, yields crystalline 16α,17α-methylene-6β-fluoroprogesterone (V) and 16α,17α-methylene-6α-fluoroprogesterone (V).

*Example 33.—16α,17α-Methylene-6β-Fluoroprogesterone (V)*

Following the procedure of Example 17, but substituting 16α,17α-methylene - 5α - hydroxy-6β-fluoropregnane-3,20-dione (XVII) (from Example 30) as starting material, yields crystalline, 16α,17α-methylene-6β-fluoroprogesterone (V).

*Example 34.—16α,17α-Methylene-6α-Fluoroprogesterone (V) From 16α,17α-Methylene-6β-Fluoroprogesterone (V)*

Following the procedure of Example 18, but substituting 16α,17α-methylene-6β-fluoroprogesterone (V) (from Examples 32 or 33) as starting material, yields light-colored crystals of 16α,17α-methylene-6α-fluoroprogesterone (V).

*Example 35.—16α,17α-Methylene-6α-Chloro-4-Pregnene-3,20-Dione (16α,17α-Methylene - 6α - Chloroprogesterone (V)*

Following the procedure of Example 19, but substituting 16α,17α-methylene - 5α - hydroxy-6β-chloropregnane-3,20-dione (XVII) (from Example 31) as starting material, yields pure 16α,17α-methylene-6α-chloroprogesterone (V).

*Example 36. — 16α,17α-Methylene-4,6-Pregnadiene-3,20-Dione (16α,17α-Methylene - 6 - Dehydroprogesterone) (XVIII)*

A solution of 12 g. of 16α,17α-methylene-4-pregnene-3,20-dione (V) (from Example 4A) and 10 g. of chloranil in 500 ml. of tertiary amyl alcohol is refluxed for a period of about 4.5 hours. The tertiary amyl alcohol is then distilled under vacuum in a nitrogen atmosphere. The residue is dissolved in methylene chloride and then shaken with dilute sodium hydroxide. The precipitate that forms is separated by filtration through diatomaceous earth. The organic phase of the filtrate is separated and washed with dilute sodium hydroxide, water and then dried. The solvent is distilled leaving a residue (crude and crystalline) which after purification by chromatography through a Florisil column and crystallization gives 16α,17α-methylene-4,6-pregnadiene-3,20-dione (XVIII).

*Example 37.—16α,17α-Methylene-6-Methyl-4,6 - Pregnadiene-3,20-Dione (16α,17α-Methylene-6-Methyl-6 - Dehydroprogesterone) (XVIII)*

Following the procedure of Example 36, but substituting 16α,17α-methylene-6α-methyl-4-pregnene-3,20 - dione (V) (from Example 4) as starting material, yields light-colored crystalline, 16α,17α-methylene-6-methyl-4,6-pregnadiene-3,20-dione (XVIII).

*Example 38.—16α,17α-Methylene-6-Fluoro - 4,6 - Pregnadiene-3,20-Dione (16α,17α-Methylene-6α-Fluoro-6-Dehydroprogesterone) (XVIII)*

Following the procedure of Example 36, but substituting 16α,17α-methylene-6α-fluoro-4-pregnene-3,20 - dione (V) (from Example 22) as starting material, adding 20 g. of calcium carbonate to the reaction mixture and refluxing it for about 24 hours in an oxygen-free atmosphere, yields light-colored crystalline, 16α,17α-methylene-6-fluoro-4,6-pregnadiene-3,20-dione (XVIII).

*Example 39.—16α,17α-Methylene-6-Fluoro - 4,6 - Pregnadiene-3,20-Dione (16α,17α-Methylene-6-Fluoro-6 - Dehydroprogesterone) (XVIII)*

Following the procedure of Example 38, but substituting 16α,17α-methylene-6β-fluoro-4-pregnene-3,20 - dione (V) (from Example 22) as starting material, yields crystalline 16α,17α-methylene-6-fluoro-4,6-pregnadiene - 3,20 - dione (XVIII).

*Example 40.—16α,17α-Methylene-6-Chloro-4,6-Pregnadiene-3,20-Dione (16α,17α-Methylene-6-Chloro-6-Dehydroprogesterone) (XVIII)*

Following the procedure of Example 36, but substituting 16α,17α-methylene-6α-chloro-4-pregnene-3,20-dione (V) (from Example 23) as starting material, yields light-colored, crystalline, 16α,17α-methylene-6-chloro-4,6-pregnadiene-3,20-dione (XVIII).

*Example 41.—16α,17α-Methylene-1,4-Pregnadiene-3,20-Dione (16α,17α-Methylene-1-Dehydroprogesterone) (XXI)*

A mixture containing 10 g. of 16α,17α-methylene-4-pregnene-3,20-dione (V) (from Example 4A), 500 ml. of tertiary butyl alcohol, 5 ml. of glacial acetic acid and 4 g. of selenium dioxide is warmed at reflux for a period of about 24 hours. An additional 4-g. portion of selenium dioxide is added and warming is continued for another 24-hour period.

The reaction mixture is cooled and filtered. The filtrate is concentrated to about 150 ml., then slowly diluted with 850 ml. of water. The resulting precipitate is isolated by filtration. The precipitate is dissolved in 300 ml. of ethyl acetate, then washed successively with four 100 ml. portions of freshly prepared cold ammonium sulfide, dilute ammonium hydroxide, water, dilute hydrochloric acid and water. The solution is dried over sodium sulfate and evaporated to give a residue containing 16α,17α-methylene-1,4-pregnadiene-3,20-dione (XXI).

The residue is dissolved in 50 ml. of methylene chloride and 100 ml. of Skellysolve B. The solution is then chromatographed over a column containing 400 g. of Florisil. The column is eluted with Skellysolve B containing increasing proportions of acetone to give 16α,17α-methylene-1,4-pregnadiene-3,20-dione (XXI), a light colored, crystalline solid, which can be further purified by recrystallization from acetone-Skellysolve B mixtures.

Heating 16α,17α-methylene-4-pregnene-3,20-dione (V) in dry benzene with 2,3-dichloro-5,6-dicyanobenzoquinone under reflux for a period of about 12 hours (as in British Patent 852,847) also yields 16α,17α-methylene-1,4-pregnadiene-3,20-dione (XXI).

*Example 42.—16α,17α-Methylene-6α-Methyl-1,4-Pregnadiene-3,20-dione (16α,17α-Methylene-6α-Methyl-1-Dehydroprogesterone) (XXI)*

Following the procedure of Example 41, but substituting 16α,17α-methylene-6α-methyl-4-pregnene-3,20-dione (V) (from Example 4) as starting material, yields light colored crystalline, 16α,17α-methylene-6α-methylene-6α-methyl-1,4-pregnadiene-3,20-dione (XXI).

*Example 43.—16α,17α-Methylene-6α-Fluoro-1,4-Pregnadiene-3,20-Dione (16α,17α-Methylene-6α-Fluoro-1-Dehydroprogesterone) (XXI)*

Following the procedure of Example 41, but substituting 16α,17α-methylene-6α-fluoro-4-pregnene-3,20-dione (V) (from Example 22) as starting material, yields crystalline 16α,17α-methylene-6α-fluoro-1,4-pregnadiene-3,20-dione (XXI).

*Example 44.—16α,17α-Methylene-6β-Fluoro-1,4-Pregnadiene-3,20-Dione (16α,17α-Methylene-6β-Fluoro-1-Dehydroprogesterone) (XXI)*

Following the procedure of Example 41, but substituting 16α,17α-methylene-6β-fluoro-4-pregnene-3,20-dione (V) (from Example 22) as starting material, yields crystalline 16α,17α-methylene-6α-fluoro-1,4-pregnadiene-3,20-dione (XXI).

*Example 45.—16α,17α-Methylene-6α-Chloro-1,4-Pregnadiene-3,20-Dione (16α,17α-Methylene-6α-Chloro-1-Dehydroprogesterone) (XXI)*

Following the procedure of Example 41, but substituting 16α,17α-methylene-6α-chloro-4-pregnene-3,20-dione (V) (from Example 23) as starting material, yields pure crystalline 16α,17α-methylene-6α-chloro-1,4-pregnadiene-3,20-dione (XXI).

*Example 46.—16α,17α-Methylene-1,4,6-Pregnatriene-3,20-Dione (16α,17α-Methylene-1,6-Bisdehydroprogesterone) (XX)*

A mixture containing 10 g. of 16α,17α-methylene-4,6-pregnadiene-3,20-dione (XVIII) (from Example 36), 500 ml. of tertiary butyl alcohol, 5 ml. of glacial acetic acid and 4 g. of selenium dioxide is warmed at reflux for 24 hours. An additional 4 g. portion of selenium dioxide is added and warming is continued for another 24-hour period.

The reaction mixture is cooled and filtered. The filtrate is concentrated to about 150 ml., then slowly diluted with 850 ml. of water. The resulting precipitate is isolated by filtration. The precipitate is dissolved in 300 ml. of ethyl acetate, then washed with four 100-ml. portions of freshly prepared cold ammonium sulfide, dilute ammonium hydroxide, water, dilute hydrochloric acid and water. The solution is dried over sodium sulfate and evaporated to give a residue containing 16α,17α-methylene-1,4,6-pregnatriene-3,20-dione (XX).

The residue is dissolved in 50 ml. of methylene chloride and 100 ml. of Skellysolve B hexanes. The solution is then chromatographed over a column containing 400 g. of Florisil. The column is eluted with increasing proportions of acetone in Skellysolve B hexanes to give 16α,17α-methylene-1,4,6-pregnatriene-3,20-dione (XX), a crystalline solid, which can be further purified by recrystallization from acetone-Skellysolve B hexanes mixtures.

*Example 47.—16α,17α-Methylene-6-Methyl-1,4,6-Pregnatriene-3,20-Dione (16α,17α-Methylene-6α-Methyl-1,6-Bisdehydroprogesterone) (XX)*

Following the procedure of Example 46, but substituting 16α,17α-methylene-6-methyl-4,6-pregnadiene-3,20-dione (XVIII) (from Example 37) as starting material, yields pure, crystalline 16α,17α-methylene-6-methyl-1,4,6-pregnatriene-3,20-dione (XX).

*Example 48.—16α,17α-Methylene-6-Fluoro-1,4,6-Pregnatriene-3,20-Dione (16α,17α-Methylene-6α-Fluoro-1,6-Bisdehydroprogesterone) (XX)*

Following the procedure of Example 46, but substituting 16α,17α-methylene-6-fluoro-4,6-pregnadiene-3,20-dione (XVIII) (from Example 38) as starting material, yields light colored, crystalline, 16α,17α-methylene-6-fluoro-1,4,6-pregnatriene-3,20-dione (XX).

*Example 49.—16α,17α-Methylene-6-Chloro-1,4,6-Pregnatriene-3,20-Dione (16α,17α-Methylene-6-Chloro-1,6-Bisdehydroprogesterone) (XX)*

Following the procedure of Example 46, but substituting 16α,17α-methylene-6-chloro-4,6-pregnadiene-3,20-dione (XVIII) (from Example 40) as starting material, yields crystalline 16α,17α-methylene-6-chloro-1,4,6-pregnatriene-3,20-dione (XX).

*Example 50.—16α,17α-Methylene-1,4,6-Pregnatriene-3,20-Dione (16α,17α-Methylene-1,6-Bisdehydroprogesterone) (XX)*

A solution of 12 g. of 16α,17α-methylene-1,4-pregnadiene-3,20-dione (XXI) (from Example 41) and 10 g. of chloranil in 500 ml. of tertiary amyl alcohol is refluxed for a period of about 4.5 hours. The tertiary amyl alcohol is then distilled off under vacuum in a nitrogen atmosphere. The residue is dissolved in methylene chloride and then shaken with dilute sodium hydroxide. The precipitate that forms is separated by filtration through diatomaceous earth. The organic phase of the filtrate is separated, washed first with dilute sodium hydroxide solution, then water and dried. The solvent is distilled off leaving a residue of crystalline 16α,17α-methylene-1,4,6-pregnatriene-3,20-dione (XX).

*Example 51.—16α,17α - Methylene-6-Methyl-1,4,6-Pregnatriene-3,20-Dione (16α,17α-Methylene-6-Methyl-1,6-Bisdehydroprogesterone) (XX)*

Following the procedure of Example 50, but substituting 16α,17α - methylene-6α-methyl-1,4-pregnadiene-3,20-dione (XXI) (from Example 42) as starting material, yields crystalline 16α,17α-methylene-6-methyl-1,4,6-pregnatriene-3,20-dione (XX).

*Example 52.—16α,17α - Methylene-6-Fluoro-1,4,6-Pregnatriene-3,20-Dione (16α,17α-Methylene-6-Fluoro-1,6-Bisdehydroprogesterone (XX)*

Following the procedure of Example 50, but substituting 16α,17α-methylene - 6α - fluoro-1,4-pregnadiene-3,20-dione (XXI) (from Example 43) as starting material, yields crystalline 16α,17α-methylene-6-fluoro-1,4,6-pregnatriene-3,20-dione (XX).

*Example 53.—16α,17α-Methylene-6-Fluoro-1,4,6-Pregnatriene-3,20-Dione (16α,17α-Methylene - 6 - Fluoro-1,6-Bisdehydroprogesterone) (XX)*

Following the procedure of Example 50, but substituting 16α,17α-methylene - 6β - fluoro-1,4-pregnadiene-3,20-dione (XXI) (from Example 44) as starting material, yields crystalline 16α,17α-methylene-6-fluoro-1,4,6-pregnatriene-3,20-dione (XX).

*Example 54.—16α,17α-Methylene-6-Chloro-1,4,6-Pregnatriene-3,20-Dione (16α,17α-Methylene - 6 - Chloro-1,6-Bisdehydroprogesterone) (XX)*

Following the procedure of Example 50, but substituting 16α,17α-methylene-6α-chloro - 1,4 - pregnadiene-3,20-dione (XXI) (from Example 45) as starting material, yields light colored, crystalline 16α,17α - methylene - 6-chloro-1,4,6-pregnatriene-3,20-dione (XX).

*Example 55.—16α,17α - Methylene-11α-Hydroxy-4-Pregnene-3,20-Dione (16α,17α-Methylene-11α-Hydroxyprogesterone) (XIX)*

A medium is prepared containing 10 g. of Cerelose dextrose technical grade and 20 g. of corn steep liquor (60% solids) in sufficient tap water to make up one liter of solution. One hundred liters of such a medium is adjusted by the addition of 25 percent sodium hydroxide solution to a pH of 5. Thereto is then added 400 ml. of lard oil and lard-oil octadecanol as an anti-foaming agent. This medium is sterilized for 45 minutes at 20 lbs. pressure and inoculated with *Rhizopus nigricans* minus strain, American Type Culture Collection No. 6227b, and incubated for 24 hours at a temperature of 28° C. using a rate of aeration and stirring such that the oxygen uptake is 6.3 to seven millimoles per hour per ml. of sodium sulfite according to the method of Cooper, Fernstrom and Miller, Ind. Eng. Chem. 36,504 (1944). To this medium containing a 24 hour growth of *Rhizopus nigricans* minus strain is added 6 g. of 16α,17α-methylene-4-pregnene-3,20-dione (V) (from Example 4A) in 150 milliliters of acetone to provide a suspension of the steroid in the culture. After an additional 24 hour period of incubation under the same conditions of temperature and aeration, the beer and mycelium are extracted. The mycelium is filtered, washed twice each time with a volume of acetone approximately equal to the volume of the mycelium, and extracted twice, each time with a volume of methylene chloride approximately equal to the volume of the mycelium. The acetone and methylene chloride extracts including solvents are added to the beer filtrate. The mixed extracts and beer filtrate are extracted successively with two one-half by volume portions of methylene chloride and then with two one-fourth by volume portions of methylene chloride. The combined methylene chloride extracts are washed with two one-tenth by volume portions of a two percent aqueous solution of sodium bicarbonate and then with two one-tenth by volume portions of water. After drying the methylene chloride extracts with about three to five grams of anhydrous sodium sulfate per liter of solvent and filtering, the solvent is removed by distillation. The residue is dissolved in a minimum of methylene chloride and chromatographed over Florisil. The product, eluted with increasing proportions of acetone in Skellysolve B, is recrystallized from methanol to yield light colored, crystalline 16α,17α-methylene-11α-hydroxy-4-pregnene-3,20-dione (XIX).

*Example 56.—16α,17α - Methylene - 11α - Hydroxy-6α-Methyl-4-Pregnene-3,20-Dione (16α,17α - Methylene-11α-Hydroxy-6α-Methylprogesterone) (XIX)*

Following the procedure of Example 55, but substituting 16α,17α - methylene-6α-methyl-4-pregnene-3,20-dione (V) (from Example 4) as starting material, yields crystalline 16α,17α - methylene-11α-hydroxy-6α-methyl-4-pregnene-3,20-dione (XIX).

*Example 57.—16α,17α - Methylene-11α-Hydroxy-6α-Fluoro-4-Pregnene-3,20-Dione (16α,17α - Methylene-11α-Hydroxy-6α-Fluoroprogesterone) (XIX)*

Following the procedure of Example 55, but substituting 16α,17α - methylene-6α-fluoro-4-pregnene-3,20-dione (V) (from Example 22) as starting material, yields light colored crystals of 16α,17α-methylene-11α-hydroxy-6α-fluoro-4-pregnene-3,20-dione (XIX).

*Example 58.—16α,17α - Methylene-11α-Hydroxy-6β-Fluoro-4-Pregnene-3,20-Dione (16α,17α - Methylene-11α-Hydroxy-6β-Fluoroprogesterone) (XIX)*

Following the procedure of Example 55, but substituting 16α,17α - methylene-6β-fluoro-4-pregnene-3,20-dione (V) (from Example 22) as starting material, yields crystalline 16α,17α-methylene-11α-hydroxy-6β-fluoro-4-pregnene-3,20-dione (XIX).

*Example 59.—16α,17α - Methylene - 11α - Hydroxy - 6α-Chloro-4-Pregnene-3,20 - Dione (16α,17α - Methylene-11α-Hydroxy-6α-Chloroprogesterone) (XIX)*

Following the procedure of Example 55, but substituting 16α,17α - methylene-6α-chloro-4-pregnene-3,20-dione (V) (from Example 23) as starting material, yields crystalline 16α,17α-methylene-11α-hydroxy-6α-chloro-4-pregnene-3,20-dione (XIX).

*Example 60.—16α,17α-Methylene - 4 - Pregnene-3,11,20-Trione (16α,17α - Methylene - 11 - Ketoprogesterone) (XIXa)*

A solution is prepared containing 3.5 g. of 16α,17α-methylene-11α-hydroxyprogesterone (XIX) (from Example 55) in 50 ml. of acetic acid at room temperature. Thereto is added dropwise a solution of 2 g. of chromium trioxide in 50 ml. of acetic acid and 0.5 ml. of water. During the addition, the temperature is maintained between 20 to 23° C. and thereafter for another period of 1.5 hours. The reaction mixture is then diluted with 1 l. of water and extracted with six 150-milliliter portions of methylene chloride. The extracts are combined, washed with dilute sodium bicarbonate solution and water, dried over anhydrous sodium sulfate and evaporated to dryness under reduced pressure. The thus obtained solid is recrystallized from methanol to yield light colored, crystalline, 16α,17α - methylene - 4 - pregnene-3,11,20-trione (XIXa).

*Example 61.—16α,17α-Methylene-6α-Methyl-4-Pregnene-3,11,20 - Trione (16α,17α - Methylene - 6α-Methyl-11-Ketoprogesterone) (XIXa)*

Following the procedure of Example 60, but substituting 16α,17α - methylene - 11α-hydroxy-6α-methyl-4-pregnene-3,20-dione (XIX) (from Example 57) as starting material, crystalline 16α,17α-methylene-6α-methyl-4-pregnene-3,11,20-trione (XIXa).

*Example 62.—16α,17α - Methylene - 6α - Fluoro-4-Pregnene-3,11,20-Trione (16α,17α-Methylene-6α-Fluoro-11-Ketoprogesterone) (XIXa)*

Following the procedure of Example 60, but substituting 16α,17α-methylene-11α-hydroxy-6α-fluoro-4-pregnene-3,20-dione (XIX) (from Example 58) as starting material, yields pure, crystalline 16α,17α-methylene-6α-fluoro-4-pregnene-3,11,20-trione (XIXa).

*Example 63.—16α,17α-Methylene-6β-Fluoro-4-Pregnene-3,11,20 - Trione (16α,17α - Methylene - 6β-Fluoro-11-Ketoprogesterone) (XIXa)*

Following the procedure of Example 60, but substituting 16α,17α - methylene - 11α - hydroxy-6β-fluoro-4-pregnene-3,20-dione (XIX) (from Example 59) as starting material, yields crystalline, 16α,17α-methylene-6β-fluoro-4-pregnene-3,11,20-trione (XIXa).

*Example 64.—16α,17α-Methylene-6α-Chloro-4-Pregnene-3,11,20 - Trione (16α,17α - Methylene - 6α-Chloro-11-Ketoprogesterone) (XIXa)*

Following the procedure of Example 60, but substituting 16α,17α - methylene - 11α-hydroxy-6α-chloro-4-pregnene-3,20-dione (XIX) (from Example 59) as starting material, yields crystalline 16α,17α-methylene-6α-chloro-4-pregnene-3,11,20-trione (XIXa).

*Example 65.—16α,17α-Methylene-11α-Hydroxy-4,6-Pregnadiene-3,20-Dione (16α,17α-Methylene-11α-Hydroxy-6-Dehydroprogesterone) (XIX)*

Following the procedure of Example 55, but substituting 16α,17α - methylene - 4,6 - pregnadiene - 3,20 - dione (XVIII) (from Example 36) as starting material, yields crystalline 16α,17α - methylene-11α-hydroxy-4,6-pregnadiene-3,20-dione (XIX).

*Example 66.—16α,17α - Methylene - 11α - Hydroxy - 6-Methyl-4,6-Pregnadiene-3,20-Dione (16α,17α - Methylene - 11α - Hydroxy-6-Methyl-6-Dehydroprogesterone) (XIX)*

Following the procedure of Example 55, but substituting 16α,17α - methylene - 6 - methyl - 4,6 - pregnadiene-3,20-dione (XVIII) (from Example 37) as starting material, yields pure, crystalline 16α,17α-methylene-11α-hydroxy-6-methyl-4,6-pregnadiene-3,20-dione (XIX).

*Example 67.—16α,17α-Methylene-11α-Hydroxy-6-Fluoro-4,6-Pregnadiene-3,20-Dione (16α,17α - Methylene-11α-Hydroxy-6-Fluoro-6-Dehydroprogesterone) (XIX)*

Following the procedure of Example 55, but substituting 16α,17α - methylene - 6-methyl-4,6-pregnadiene-3,20-dione (XVIII) (from Example 38) as starting material, yields light colored, crystalline 16α,17α-methylene-11α-hydroxy-6-fluoro-4,6-pregnadiene-3,20-dione (XIX).

*Example 68.—16α,17α - Methylene - 11α - Hydroxy-6-Chloro-4,6-Pregnadiene-3,20-Dione (16α,17α - Methylene - 11α - Hydroxy - 6-Chloro-6-Dehydroprogesterone) (XIX)*

Following the procedure of Example 55, but substituting 16α,17α - methylene - 6-chloro-4,6-pregnadiene-3,20-dione (XVIII) (from Example 40) as starting material, yields crystalline 16α,17α - methylene - 11α-hydroxy-6-chloro-4,6-pregnadiene-3,20-dione (XIX).

*Example 69. — 16α,17α - Methylene - 4,6 - Pregnadiene-3,11,20-Trione (XIXa), 16α,17α-Methylene-6-Methyl-4,6-Pregnadiene-3,11,20-Trione (XIXa), 16α,17α-Methylene-6-Fluoro-4,6-Pregnadiene-3,11,20-trione (XIXa), and 16α,17α - Methylene - Chloro - 4,6 - Pregnadiene-3,11,20-Trione (XIXa)*

Following the procedure of Example 60, but substituting as starting materials, 16α,17α-methylene-11α-hydroxy-4,6-pregnadiene-3,20-dione (XIX) (from Example 66), 16α,17α-methylene-11α-hydroxy-6 - methyl - 4,6 - pregnadiene-3,20-dione (XIX) (from Example 67), 16α,17α-methylene - 11α - hydroxy - 6 - fluoro-4,6-pregnadiene-3,20-dione (XIX) (from Example 68), and 16α,17α-methylene - 11α - hydroxy - 6 - chloro - 4,6-pregnadiene-3,20-dione (XIX) (from Example 70), yields, respectively, light colored, crystalline, 16α,17α-methylene-4,6-pregnadiene-3,11,20-trione (XIXa), 16α,17α-methylene-6-methyl-4,6-pregnadiene-3,11,20-trione (XIXa), 16α,17α-methylene-6-fluoro-4,6-pregnadiene - 3,11,20 - trione (XIXa) and 16α,17α-methylene-6-chloro-4,6-pregnadiene-3,11,20-trione (XIXa).

*Example 70.—16α,17α-Methylene-11α-Hydroxy-1,4-Pregnadiene-3,20-Dione (16α,17α-Methylene-11α-Hydroxy-1-Dehydroprogesterone) (XIX)*

Following the procedure of Example 55, but substituting 16α,17α-methylene-1,4-pregnadiene-3,20-dione (XXI) (from Example 41) as starting material, yields pure, crystalline, 16α,17α - methylene-11α-hydroxy-1,4-pregnadiene-3,20-dione (XIX).

Alternatively, 16α,17α - methylene-11α-hydroxy-4-pregnene-3,20-dione prepared by the method of Example 55, can be 1-dehydrogenated by the method of Example 41 to give 16α,17α-methylene-11α-hydroxy-1,4-pregnadiene-3,20-dione (XIX).

*Example 71.—16α,17α - Methylene - 11α - Hydroxy - 6α-Methyl-1,4-Pregnadiene-3,20-Dione (16α,17α - Methylene-11α - Hydroxy - 6α-Methyl-1-Dehydroprogesterone) (XIX)*

Following the procedure of Example 55, but substituting 16α,17α - methylene-6α-methyl-1,4-pregnadiene-3,20-dione (XXI) (from Example 42) as starting material, yields crystalline 16α,17α-methylene-11α-hydroxy-6α-methyl-1,4-pregnadiene-3,20-dione (XIX).

Alternatively, 16α,17α - methylene - 11α - hydroxy-6α-methyl-4-pregnene-3,20-dione, prepared by the method of Example 56, can be 1-dehydrogenated by the method of Example 41 to give 16α,17α-methylene-11α-hydroxy-6α-methyl-1,4-pregnadiene-3,20-dione (XIX).

*Example 72.—16α,17α-Methylene-11α-Hydroxy-6α-Fluoro - 1,4-Pregnadiene-3,20-Dione (16α,17α-Methylene-11α-Hydroxy-6α-Fluoro-1-Dehydroprogesterone) (XIX)*

Following the procedure of Example 55, but substituting 16α,17α - methylene - 6α - fluoro-1,4-pregnadiene-3,20-dione (XXI) (from Example 43) as starting material, yields crystalline, 16α,17α-methylene-11α-hydroxy-6α-fluoro-1,4-pregnadiene-3,20-dione (XIX).

*Example 73.—16α,17α - Methylene-11α-Hydroxy-6β-Fluoro - 1,4-Pregnadiene-3,20-Dione (16α,17α-Methylene-11α - Hydroxy - 6β - Fluoro - 1 - Dehydroprogesterone) (XIX)*

Following the procedure of Example 55, but substituting 16α,17α - methylene - 6β-fluoro-1,4-pregnadiene-3,20-dione (XXI) (from Example 44) as starting material, yields light colored, crystalline 16α,17α-methylene-11α-hydroxy-6β-fluoro-1,4-pregnadiene-3,20-dione (XIX).

*Example 74.—16α,17α - Methylene - 11α - Hydroxy - 6α-Chloro-1,4-Pregnadiene-3,20-Dione (16α,17α - Methylene - 11α - Hydroxy-6α-Chloro-1-Dehydroprogesterone) (XIX)*

Following the procedure of Example 55, but substituting 16α,17α - methylene-6α-chloro-1,4-pregnadiene-3,20-dione (XXI) (from Example 45) as starting material, yields crystalline 16α,17α - methylene - 11α-hydroxy-6α-chloro-1,4-pregnadiene-3,20-dione (XIX).

*Example 75.—16α,17α - Methylene-1,4-Pregnadiene-3,11,20-Trione (XIXa), 16α,17α-Methylene-6α-Methyl-1,4-Pregnadiene-3,11,20-Trione (XIXa), 16α,17α-Methylene-6α-Fluoro-1,4-Pregnadiene-3,11,20-Trione (XIXa), 16α,17α-Methylene-6β-Fluoro-1,4-Pregnadiene-3,11,20-Trione (XIXa) and 16α,17α-Methylene-6α-Chloro-1,4-Pregnadiene-3,11,20-Trione (XIXa)*

Following the procedure of Example 60, but substituting as starting materials, 16α,17α-methylene-11α-hydroxy-1,4-pregnadiene-3,20-dione (XIX) (from Example 70), 16α,17α - methylene - 11α - hydroxy - 6α - methyl - 1,4-pregnadiene-3,20-dione (XIX) (from Example 71), 16α,17α - methylene - 11α - hydroxy - 6α - fluoro - 1,4 - pregnadiene-3,20-dione (XIX) (from Example 72), 16α,17α-methylene - 11α - hydroxy - 6β - fluoro - 1,4 - pregnadiene-3,20-dione (XIX) (from Example 73) and 16α,17α-methylene - 11α - hydroxy - 6α - chloro - 1,4 - pregnadiene-3,20-dione (XIX) (from Example 74), yields, respectively, light colored, crystalline, 16α,17α-methylene-1,4-pregnadiene-3,11,20-trione (XIXa), 16α,17α-methylene - 6α - methyl - 1,4 - pregnadiene - 3,11,20 - trione (XIXa), 16α,17α-methylene-6α-fluoro-1,4-pregnadiene-3,11,20-trione (XIXa), 16α,17α-methylene-6β-fluoro-1,4-pregnadiene-3,11,20-trione (XIXa) and 16α,17α-methylene - 6α - chloro - 1,4 - pregnadiene - 3,11,20 - trione (XIXa).

*Example 76.—16α,17α - Methylene - 11α - Hydroxy-1,4,6-Pregnatriene - 3,20-Dione (16α,17α-Methylene-11α-Hydroxy-1,6-Bisdehydroprogesterone) (XIX)*

Following the procedure of Example 55, but substituting 16α,17α-methylene-1,4,6-pregnatriene-3,20-dione (XX) (from Example 46) as starting material, yields crystalline 16α,17α - methylene-11α-hydroxy-1,4,6-pregnatriene-3,20-dione (XIX).

Alternatively, 16α,17α - methylene - 11α - hydroxy - 4,6-pregnadiene-3,20-dione, prepared by the method of Example 55, can be 1-dehydrogenated by the method of Example 41, to give 16α,17α-methylene-11α-hydroxy-1,4,6-pregnatriene-3,20-dione (XIX).

*Example 77.—16α,17α-Methylene-11α-Hydroxy-6-Methyl-1,4,6 - Pregnatriene - 3,20 - Dione (16α,17α-Methylene-11α - Hydroxy - 6-Methyl-1,6-Bisdehydroprogesterone) (XIX)*

Following the procedure of Example 55, but substituting 16α,17α - methylene - 6 - methyl - 1,4,6 - pregnatriene - 3,20-dione (XX) (from Example 47) as starting material, yields light colored, crystalline, 16α,17α-methylene-11α-hydroxy-6-methyl-1,4,6-pregnatriene-3,20-dione (XIX).

*Example 78.—16α,17α-Methylene-11α-Hydroxy-6-Fluoro-1,4,6-Pregnatriene-3,20-Dione (16α,17α-Methylene-11α-Hydroxy-6-Fluoro-1,6-Bisdehydroprogesterone) (XIX)*

Following the procedure of Example 55 but substituting 16α,17α - methylene - 6 - fluoro - 1,4,6 - pregnatriene - 3,20-dione (XX) (from Example 48) as starting material, yields crystalline 16α,17α-methylene-11α-hydroxy-6-fluoro-1,4,6-pregnatriene-3,20-dione (XIX).

*Example 79.—16α,17α-Methylene-11α-Hydroxy-6-Chloro-1,4,6-Pregnatriene-3,20-Dione (16α,17α-Methylene-11α-Hydroxy-6-Chloro-1,6-Bisdehydroprogesterone) (XIX)*

Following the procedure of Example 55, but substituting 16α,17α - methylene - 6 - chloro - 1,4,6 - pregnatriene - 3,20-dione (XX) (from Example 49) as starting material, yields pure, crystalline 16α,17α-methylene-11α-hydroxy-6-chloro-1,4,6-pregnatriene-3,20-dione (XIX).

*Example 80.—16α,17α - Methylene-1,4,6-Pregnatriene-3,11,20-Trione (XIXa), 16α,17α-Methylene - 6 - Methyl-1,4,6-Pregnatriene - 3,11,20 - Trione (XIXa), 16α,17α-Methylene-6-Fluoro - 1,4,6 - Pregnatriene-3,11,20-Trione (XIXa), and 16α,17α - Methylene-6-Chloro-1,4,6-Pregnatriene-3,11,20-Trione (XIXa)*

Following the procedure of Example 60, but substituting as starting materials, 16α,17α-methylene-11α-hydroxy-1,4,6-pregnatriene-3,20-dione (XIX) (from Example 76), 16α,17α-methylene - 11α - hydroxy-6-methyl-1,4,6-pregnatriene-3,20-dione (XIX) (from Example 77), 16α,17α - methylene-11α-hydroxy - 6 - fluoro - 1,4,6-pregnatriene-3,20-dione (XIX) (from Example 78), and 16α,17α - methylene-11α-hydroxy-6-chloro - 1,4,6 - pregnatriene-3,20-dione (XIX) (from Example 79), yields, respectively, light colored, crystalline, 16α,17α-methylene-1,4,6-pregnatriene-3,11,20-trione (XIXa), 16α,17α-methylene-6-methyl-1,4,6-pregnatriene - 3,11,20 - trione (XIXa), 16α,17α - methylene-6-fluoro-1,4,6-pregnatriene-3,11,20-trione (XIXa), and 16α,17α-methylene-6-chloro-1,4,6-pregnatriene-3,11,20-trione (XIXa).

*Example 81. — 16α,17α-Methylene-11β-Hydroxy-4-Pregnene-3,20-Dione (16α,17α-Methylene - 11β - Hydroxyprogesterone) (XIX)*

A seed culture of *Cunninghamella blakesleeana* (ATCC 8688b), obtained from spores grown on a 2% agar, 5% malt extract solids at a pH of 6.0 is prepared by growth in a medium containing, per liter of tap water, 10 g. of dextrose (Cerelose) and 20 g. of liquid corn steep liquor (containing about 1.2 g. solids) adjusted to a pH of about 5 with 25% aqueous sodium hydroxide.

Five one-liter portions of the above medium are inoculated with the seed culture and growth with aeration and shaking was continued for 48 hours. Then 0.2 g. of 16α,17α-methylene-4-pregnene-3,20-dione (V) (from Example 4A) in 30 ml. of alcohol is added to each flask and fermentation continued for another 48 hours, at which time the pH is 5.9.

The mycelium is filtered from the beer and the beer extracted four times with one-fourth by volume amounts of methylene chloride containing 25% ethyl acetate. The extracts are evaporated to dryness. The residue thus obtained is redissolved in 150 ml. of methylene chloride and chromatographed on a column of magnesium silicate. The column is developed with hexanes containing increasing proportions of acetone to elute a mixture containing the desired 11β-hydroxy-product. The crude product is crystallized from a mixture of hexanes and acetone and recrystallized from the same solvent pair to yield light colored, crystalline 16α,17α-methylene-11β-hydroxy-4-pregnene-3,20-dione (XIX).

*Example 82.—16α,17α - Methylene - 11β - Hydroxy - 6α-Methyl-4-Pregnene - 3,20 - Dione (16α,17α-Methylene-11β-Hydroxy-6α-Methylprogesterone) (XIX)*

Following the procedure of Example 81, but substituting 16α,17α - methylene-6α-methyl-4-pregnene-3,20-dione (V) (from Example 4) as starting material yields crystalline 16α,17α-methylene-11β-hydroxy-6α-methyl-4-pregnene-3,20-dione (XIX).

*Example 83.—16α,17α - Methylene - 11β - Hydroxy - 6α-Fluoro - 4 - Pregnene-3,20-Dione (16α,17α-Methylene-11β-Hydroxy-6α-Fluoroprogesterone) (XIX)*

Following the procedure of Example 81, but substituting 16α,17α-methylene-6α-fluoro-4-pregnene - 3,20 - dione (V) (from Example 22) as starting material, yields pure, crystalline 16α,17α-methylene-11β-hydroxy - 6α - fluoro-4-pregnene-3,20-dione (XIX).

*Example 84.—16α,17α - Methylene - 11β - Hydroxy - 6β-Fluoro-4-Pregnene - 3,20 - Dione (16α,17α-Methylene-11β-Hydroxy-6β-Fluoroprogesterone) (XIX)*

Following the procedure of Example 81, but substituting 16α,17α-methylene-6β-fluoro-4-pregnene - 3,20 - dione (V) (from Example 22) as starting material, yields light colored, crystalline 16α,17α-methylene-11β-hydroxy-6β-fluoro-4-pregnene-3,20-dione (XIX).

*Example 85.—16α,17α - Methylene - 11β - Hydroxy - 6α-Chloro-4-Pregnene - 3,20 - Dione (16α,17α-Methylene-11β-Hydroxy-6α-Chloroprogesterone) (XIX)*

Following the procedure of Example 81, but substituting 16α,17α - methylene-6α-chloro-4-pregnene-3,20-dione (V) (from Example 23) as starting material, yields crystalline 16α,17α-methylene-11β-hydroxy-6α-chloro-4-pregnene-3,20-dione (XIX).

*Example 86.—16α,17α-Methylene - 4 - Pregnene-3,11,20-Trione (16α,17α - Methylene - 11 - Ketoprogesterone) (XIXa)*

Following the procedure of Example 60, but substituting 16α,17α-methylene-11β-hydroxy - 4 - pregnene - 3,20-dione (XIX) (from Example 81) as starting material, yields pure, crystalline 16α,17α-methylene-4-pregnene-3,11,20-trione (XIXa).

*Example 87.—16α,17α-Methylene-6α-Methyl-4-Pregnene-3,11,20-Trione (16α,17α - Methylene - 6α - Methyl - 11-Ketoprogesterone) (XIXa)*

Following the procedure of Example 60, but substituting 16α,17α-methylene-11β-hydroxy - 6α - methyl-4-pregnene-3,20-dione (XIX) (from Example 82) as starting material, yields crystalline 16α,17α-methylene-6α-methyl-4-pregnene-3,11,20-trione (XIXa).

*Example 88.—16α,17α-Methylene-6α-Fluoro-4-Pregnene-3,11,20-Trione (16α,17α - Methylene - 6α - Fluoro - 11-Ketoprogesterone) (XIXa)*

Following the procedure of Example 60, but substituting 16α,17α - methylene-11β-hydroxy - 6α - fluoro-4-pregnene-3,20-dione (XIX) (from Example 83) as starting material, yields pure, crystalline 16α,17α-methylene-6α-fluoro-4-pregnene-3,11,20-trione (XIXa).

*Example 89.—16α,17α-Methylene-6β-Fluoro-4-Pregnene-3,11,20-Trione (16α,17α - Methylene - 6β - Fluoro - 11-Ketoprogesterone) (XIXa)*

Following the procedure of Example 60, but substituting 16α,17α - methylene-11β-hydroxy-6β-fluoro - 4 - pregnene-3,20-dione (XIX) (from Example 84) as starting material, yields crystalline 16α,17α-methylene-6β-fluoro-4-pregnene-3,11,20-trione (XIXa).

*Example 90.—16α,17α-Methylene-6α-Chloro-4-Pregnene-3,11,20-Trione (16α,17α - Methylene - 6α - Chloro - 11-Ketoprogesterone) (XIXa)*

Following the procedure of Example 60, but substituting 16α,17α - methylene-11β-hydroxy-6α-chloro - 4 - pregnene-3,20-dione (XIX) (from Example 85) as starting material, yields crystalline, 16α,17α-methylene-6α-chloro-4-pregnene-3,11,20-trione (XIXa).

*Example 91.—16α,17α - Methylene - 11β - Hydroxy - 4,6-Pregnadiene-3,20-Dione (16α,17α - Methylene-11β-Hydroxy-6-Dehydroprogesterone) (XIX)*

Following the procedure of Example 81, but substituting 16α,17α - methylene - 4,6 - pregnadiene - 3,20 - dione (XVIII) (from Example 36) as starting material, yields light colored, crystalline 16α,17α-methylene-11β-hydroxy-4,6-pregnadiene-3,20-dione (XIX).

Alternatively, 16α,17α - methylene-11β-hydroxy-4-pregnene-3,20-dione (XIX), prepared by the method of Example 81, can be 6-dehydrogenated by the method of Example 36 to give 16α,17α-methylene-11β-hydroxy-4,6-pregnadiene-3,20-dione (XIX).

*Example 92. — 16α,17α-Methylene-11β-Hydroxy-6-Methyl-4,6-Pregnadiene - 3,20 - Dione (16α,17α-Methylene-11β - Hydroxy - 6 - Methyl - 6 - Dehydroprogesterone) (XIX)*

Following the procedure of Example 81, but substituting 16α,17α - methylene-6-methyl - 4,6 - pregnadiene-3,20-dione (XVIII) (from Example 37) as starting material, yields light colored, crystalline 16α,17α-methylene-11β-hydroxy-6-methyl-4,6-pregnadiene-3,20-dione (XIX).

Alternatively, 16α,17α - methylene - 11β - hydroxy - 6α-methyl-4-pregnene-3,20-dione (XIX), prepared by the method of Example 82, can be 6-dehydrogenated by the method of Example 37 to give 16α,17α-methylene-11β-hydroxy-6-methyl-3,20-dione (XIX).

*Example 93.—16α,17α - Methylene - 11β - Hydroxy - 6-Fluoro-4,6-Pregnadiene-3,20-Dione (16α,17α - Methylene - 11β - Hydroxy - 6-Fluoro-6-Dehydroprogesterone) (XIX)*

Following the procedure of Example 81, but substituting 16α,17α-methylene-6-fluoro - 4,6 - pregnadiene - 3,20-dione (XVIII) (from Example 38) as starting material, yields light colored, crystalline 16α,17α-methylene-11β-hydroxy-6-fluoro-4,6-pregnadiene-3,20-dione (XIX).

Alternatively, 16α,17α - methylene - 11β - hydroxy - 6α-fluoro-4-pregnene-3,20-dione (XIX), prepared by the method of Example 83, can be 6-dehydrogenated by the method of Example 38 to give 16α,17α-methylene-11β-hydroxy-6-fluoro-4,6-pregnadinene-3,20-dione (XIX).

*Example 94.—16α,17α - Methylene - 11β - Hydroxy - 6-Chloro - 4,6 - Pregnadiene - 3,20 - Dione - (16α,17α-Methylene - 11β - Hydroxy - 6 - Chloro - 6 - Dehydroprogesterone) (XIX)*

Following the procedure of Example 81, but substituting 16α,17α - methylene - 6 - chloro - 4,6 - pregnadiene-3,20-dione (XVIII) (from Example 40) as starting material, yields crystalline 16α,17α-methylene-11β-hydroxy-6-chloro-4,6-pregnadiene-3,20-dione (XIX).

Alternatively, 16α,17α - methylene - 11β - hydroxy - 6α-chloro-4-pregnene-3,20-dione (XIX), prepared by the method of Example 85, can be 6-dehydrogenated by the method of Example 40 to give 16α,17α-methylene-11β-hydroxy-6-chloro-4,6-pregnadiene-3,20-dione (XIX).

*Example 95.—16α,17α - Methylene - 4,6 - Pregnadiene-3,11,20 - Trione (XIXa), 16α,17α - Methylene - 6-Methyl-4,6-Pregnadiene-3,11,20-Trione (XIXa), 16α-17α - Methylene - 6 - Fluoro - 4,6 - Pregnadiene - 3,11,20-Trione (XIXa), and 16α,17α-Methylene-6-Chloro-4,6-Pregnadiene-3,11,20-Trione (XIXa)*

Following the procedure of Example 60, but substituting as starting materials, 16α,17α-methylene-11β-hydroxy-4,6-pregnadiene-3,20-dione (XIX) (from Example 91), 16α,17α - methylene - 11β - hydroxy - 6 - methyl - 4,6-pregnadiene-3,20-dione (XIX) (from Example 92), 16α,17α - methylene 11β - hydroxy - 6 - fluoro - 4,6 - pregnadiene-3,20-dione (XIX) (from Example 93), 16α,17α-methylene - 11β - hydroxy - 6 - chloro - 4,6 - pregnadiene-3,20-dione (XIX) (from Example 94), yields, respectively, light colored, crystalline 16α,17α-methylene-4,6-pregnadiene-3,11,20-trione (XIXa), 16α,17α - methylene-6-methyl-4,6-pregnadiene-3,11,20-trione (XIXa), 16α,17α-methylene - 6 - fluoro - 4,6 - pregnadiene - 3,11,20 - trione (XIXa), and 16α,17α-methylene-6-chloro-4,6-pregnadiene-3,11,20-trione (XIXa).

*Example 96.—16α,17α - Methylene - 11β - Hydroxy - 1,4-Pregnadiene - 3,20 - Dione (16α,17α - Methylene-11β-Hydroxy-1-Dehydroprogesterone) (XIX)*

Following the procedure of Example 81, but substituting 16α,17α-methylene-1,4-pregnadiene - 3,20 - dione (XXI) (from Example 41) as starting material, yields light colored, crystals of 16α,17α-methylene-11β-hydroxy-1,4-pregnadiene-3,20-dione (XIX).

Alternatively, 16α,17α-methylene-11β-hydroxy-4-pregnene-3,20-dione (XIX), prepared by the method of Example 81, can be 1-dehydrogenated by the method of Example 41 to give 16α,17α-methylene-1,4-pregnadiene-3,20-dione (XIX).

*Example 97.—16α,17α-Methylene - 11β - Hydroxy - 6α-Methyl - 1,4 - Pregnadiene - 3,20 - Dione (16α,17α-Methylene - 11β - Hydroxy - 6α - Methyl - 1 - Dehydroprogesterone) (XIX)*

Following the procedure of Example 81, but substituting 16α,17α - methylene - 6α - methyl - 1,4 - pregnadiene-3,20-dione (XXI) (from Example 42) as starting material, yields crystalline 16α,17α-methylene-11β - hydroxy - 6α-methyl-1,4-pregnadiene-3,20-dione (XIX).

Alternatively, 16α,17α - methylene - 11β - hydroxy - 6α-methyl-4-pregnene-3,20-dione (XIX), prepared by the method of Example 82, can be 1-dehydrogenated by the method of Example 42 to give 16α,17α-methylene-11β-hydroxy-6α-methyl-1,4-pregnadiene-3,20-dione (XIX).

*Example 98.—16α,17α - Methylene - 11β - Hydroxy - 6α-Fluoro - 1,4 - Pregnadiene - 3,20 - Dione (16α,17α - Methylene - 11β-Hydroxy - 6α - Fluoro - 1 - Dehydroprogesterone) (XIX)*

Following the procedure of Example 81, but substituting 16α,17α-methylene-6α-fluoro-1,4-pregnadiene - 3,20-dione (XXI) (from Example 43) as starting material, yields crystalline 16α,17α-methylene - 11β - hydroxy - 6α-fluoro-1,4-pregnadiene-3,20-dione (XIX).

Alternatively, 16α,17α - methylene - 11β - hydroxy - 6α-fluoro-4-pregnene-3,20-dione (XIX), prepared by the method of Example 83 can be 1-dehydrogenated by the method of Example 43 to give 16α,17α-methylene-11β-hydroxy-6α-fluoro-1,4-pregnadiene-3,20-dione (XIX).

*Example 99.—16α,17α - Methylene - 11β - Hydroxy - 6β-Fluoro - 1,4 - Pregnadiene - 3,20 - Dione (16α,17α-Methylene - 11β-Hydroxy - 6β - Flouro - 1 - Dehydroprogesterone) (XIX)*

Following the procedure of Example 81, but substituting 16α,17α - methylene - 6β - fluoro - 1,4 - pregnadiene-3,20-dione (XXI) (from Example 44) as starting material, yields pure crystalline 16α,17α-methylene-11β-hydroxy-6β-fluoro-1,4-pregnadiene-3,20-dione (XIX).

Alternatively, 16α,17α - methylene - 11β - hydroxy-6β-fluoro-4-pregnene-3,20-dione (XIX), prepared by the method of Example 84, can be 1-dehydrogenated by the method of Example 44 to give 16α,17α-methylene-11β-hydroxy-6β-fluoro-1,4-pregnadiene-3,20-dione (XIX).

*Example 100.—16α,17α-Methylene - 11β - Hydroxy - 6α-Chloro-1,4-Pregnadiene-3,20-Dione (16α,17α-Methylene - 11β - Hydroxy - 6α - Chloro - 1 - Dehydroprogesterone) (XIX)*

Following the procedure of Example 84, but substituting 16α,17α - methylene - 6α - chloro - 1,4 - pregnadiene-3,20-dione (XXI) (from Example 45) as starting material, yields crystalline 16α,17α-methylene-11β-hydroxy-6α-chloro-1,4-pregnadiene-3,20-dione (XIX).

Alternatively, 16α,17α-methylene - 11β - hydroxy - 6α-chloro-4-pregnene-3,20-dione (XIX), prepared by the method of Example 85, can be 1-dehydrogenated by the method of Example 45 to give 16α,17α-methylene-11β-hydroxy-6α-chloro-1,4-pregnadiene-3,20-dione (XIX).

*Example 101.—16α,17α-Methylene-1,4-Pregnadiene-3,11,20-Trione (XIXa), 16α,17α-Methylene-6α-Methyl-1,4-Pregnadiene-3,11,20-Trione (XIXa), 16α,17α-Methylene - 6α - Fluoro - 1,4 - Pregnadiene - 3,11,20 Trione (XIXa), 16α,17α-Methylene-6β-Fluoro-1,4-Pregnadiene-3,11,20-Trione (XIXa) and 16α,17α-Methylene-6α-Chloro-1,4-Pregnadiene-3,11,20-Trione (XIXa)*

Following the procedure of Example 60, but substituting as starting materials, 16α,17α-methylene-11β-hydroxy-1,4-pregnadiene-3,20-dione (XIX) (from Example 96), 16α,17α-methylene-11β-hydroxy - 6α-methyl - 1,4-pregnadiene-3,20-dione (XIX) (from Example 97), 16α,17α-methylene-11β-hydroxy - 6α-fluoro-1,4-pregnadiene-3,20-dione (XIX) (from Example 98), 16α, 17α-methylene-11β-hydroxy-6β-fluoro-1,4-pregnadiene-3,20-dione (XIX) (from Example 99), 16α,17α-methylene-11β-hydroxy-6α-chloro-1,4-pregnadiene-3,20-dione (XIX) (from Example 100), yields, respectively, light colored, crystalline 16α,17α-methylene-1,4-pregnadiene - 3,11,20-trione (XIXa), 16α,17α-methlyene - 6α-methyl - 1,4-pregnadiene-3,11,20-trione (XIXa), 16α,17α-methylene-6α-fluoro-1,4-pregnadiene-3,11,20-trione (XIXa),16α17α-methylene-6β-fluoro-1,4-pregnadiene-3,11,20-trione (XIXa) and 16α,17α-methylene - 6α-chloro - 1,4-pregnadiene - 3,11,20 - trione (XIXa).

*Example 102. — 16α,17α-Methylene-11β-Hydroxy-1,4,6-Pregnatriene - 3,20-Dione (16α,17α-Methylene - 11β-Hydroxy-1,6-Bisdehydroprogesterone) (XIX)*

Following the procedure of Example 81, but substituting 16α,17α-methylene - 1,4,6-pregnatriene - 3,20-dione (XX) (from Example 46) as starting material, yields crystalline 16α,17α-methylene-11β-hydroxy-1,4,6-pregnatriene-3,20-dione (XIX).

Alternatively, 16α,17α-methylene - 11β-hydroxy - 4,6-pregnadiene-3,20-dione (XIX) prepared by the method of Example 91, can be 1-dehydrogenated by the method of Example 46 to give 16α,17α-methylene-11β-hydroxy-1,4,6-pregnatriene-3,20-dione (XIX).

*Example 103. — 16α,17α - Methylene-11β - Hydroxy - Methyl-1,4,6-Pregnatriene-3,20-Dione (16α,17α-Methylene-11β-Hydroxy - 6-Methyl - 1,6-Bisdehydroprogesterone) (XIX)*

Following the procedure of Example 81, but substituting 16α,17α-methylene-6-methyl-1,4,6-pregnatriene-3,20-dione (XX) (from Example 47) as starting material, yields pure, crystalline 16α,17α-methylene-11β-hydroxy-6-methyl-1,4,6-pregnatriene-3,20-dione (XIX).

Alternatively 16α,17α-methylene-11β-hydroxy-6-methyl-4,6-pregnadiene-3,20-dione (XIX), prepared by the method of Example 92, can be 1-dehydrogenated by the method of Example 47 to give 16α,17α-methylene-11β-hydroxy-6-methyl-1,4,6-pregnatriene-3,20-dione (XIX).

*Example 104. — 16α,17α - Methylene - 11β - Hydroxy-6-Fluoro-1,4,6-Pregnatriene-3,20-dione (16α,17α-Methylene-11β-Hydroxy-6-Fluoro - 1,6-Bisdehydroprogesterone) (XIX)*

Following the procedure of Example 81, but substituting 16α,17α-methylene-6-fluoro-1,4,6-pregnatriene-3,20-dione (XX) (from Example 48) as starting material, yields crystalline 16α,17α-methylene-11β-hydroxy-6-fluoro-1,4,6-pregnatriene-3,20-dione (XIX).

Alternatively, 16α,17α-methylene-11β-hydroxy-6-fluoro-4,6-pregnadiene-3,20-dione (XIX), prepared by the method of Example 93, can be 1-dehydrogenated by the method of Example 48 to give 16α,17α-methylene-11β-hydroxy-6-fluoro-1,4,6-pregnatriene-3,20-dione (XIX).

*Example 105. — 16α,17α - Methylene - 11β-Hydroxy-6-Chloro-1,4,6-Pregnatriene-3,20-Dione (16α,17α-Methylene - 11β-Hydroxy-6-Chloro - 1,6-Bisdehydroprogesterone) (XIX)*

Following the procedure of Example 84, but substituting 16α,17α-methylene-6-chloro-1,4,6-pregnatriene-3,20-dione (XX) (from Example 50) as starting material, yields light colored crystals of 16α,17α-methylene-11β-hydroxy-6-chloro-1,4,6-pregnatriene-3,20-dione (XIX).

Alternatively, 16α,17α - methylene - 11β-hydroxy - 6-chloro-4,6-pregnadiene-3,20-dione (XIX), prepared by the method of Example 94, can be 1-dehydrogenated by the method of Example 49 to give 16α,17α-methylene-11β-hydroxy-6-chloro-1,4,6-pregnatriene-3,20-dione (XIX).

*Example 106.—16α,17α-Methylene - 1,4,6-Pregnatriene-3,11,20-Trione (XIXa), 16α,17α-Methylene-6α-Methyl-1,4,6-Pregnatriene-3,11,20-Trione (XIXa), 16α,17α-Methylene - 6 - Fluoro - 1,4,6 - pregnatriene - 3,11,20-Trione (XIXa), and 16α,17α-Methylene-6-Chloro-1,4,6-Pregnatriene-3,11,20-Trione (XIXa)*

Following the procedure of Example 60, but substituting as starting materials, 16α,17α-methylene-11β-hydroxy-1,4,6-pregnatriene-3,20-dione (XIX) (from Example 102), 16α,17α - methylene - 11β-hydroxy-6-methyl-1,4,6-pregnatriene-3,20-dione (XIX) (from Example 103), 16α,17α - methylene - 11β - hydroxy-6-floro-1,4,6-pregnatriene-3,20-dione (XIX) (from Example 104), 16α,17α-methylene - 11β-hydroxy-6-chloro-4,6-pregnatriene-3,20-dione (XIX) (from Example 105), yields, respectively, light colored, crystalline 16α,17α-methylene-1,4,6-pregnatriene-3,11,20-trione (XIXa), 16α,17α-methylene-6-methyl-1,4,6-pregnatriene-3,11,20-trione (XIXa), 16α 17α-methylene-6-fluoro - 1,4,6-pregnatriene-3,11,20-trione (XIXa), and 16α,17α-methylene-6-chloro-1,4,6-pregnatriene-3,11,20-trione (XIXa).

*Example 107. — 16α,17α-Methylene-5-pregnene-3,11,20-Trione 3,20-Bis(Ethylene Ketal) [16α,17αMethylene-11 - Ketoprogesterone 3,20 - Bis(Ethylene Ketal)] (XIXb)*

A mixture of 300 mg. of 16α,17α-methylene-4-pregnene-3,11,20-trione (XIXa) (from Example 60), 5 ml. of ethylene glycol, 50 mg. of para-toluenesulfonic acid monohydrate and 100 ml. of benzene is placed in a reaction flask equipped with a reflux condenser and a water trap so arranged that the condensed vapors pass through the water trap before returning to the reaction flask. The mixture is heated to reflux and allow to reflux for about 5 hours while at the same time being agitated. The water of reaction formed is continuously removed by co-distillation with the refluxing benzene and is collected in the water trap. The benzene solution is then washed with successive portions of a dilute sodium bicarbonate solution and water, and then dried. The residue remaining after evaporation of the solvent is crude 16α,17α-methylene-5-pregnene-3,11,20-trione 3,20-bis(ethylene ketal) (XIXb) which is recrrystallized from ethyl acetate to give the pure, light colored, crystalline product.

*Example 108.—16α,17α-Methylene-6-Methyl-5-Pregnene-3,11,20-Trione 3,20-Bis(Ethylene Ketal) [16α,17α-Methylene - 6-Methyl - 11-Ketoprogesterone 3,20-Bis-(Ethylene Ketal)] (XIXb)*

Following the procedure of Example 107, but substituting 16α,17α-methylene-6α-methyl-4-pregnene-3,11,20-trione (XIXa) (from Example 61) as starting material, yields pure, crystalline 16α,17α-methylene-6-methyl-5-pregnene-3,11,20-trione 3,20-bis(ethylene ketal) (XIXb).

*Example 109.—16α,17α-Methylene-6-Fluoro-5-Pregnene-3,11,20-Trione 3,20-Bis(Ethylene Ketal) [16α,17α-Methylene - 6 - Fluoro - 11 - Ketoprogesterone 3,20-Bis-(Ethylene Ketal)] (XIXb)*

Following the procedure of Example 107, but substituting 16α,17α-methylene-6α-fluoro-4-pregnene-3,11,20-trione (XIXa) (from Example 62) as starting material, yields crystalline 16α,17α-methylene-6-fluoro-5-pregnene-3,11,20-trione 3,20-bis(ethylene ketal) (XIXb).

*Example 110.—16α,17α-Methylene-6-Fluoro-5-Pregnene-3,11,20-Trione 3,20-Bis(Ethylene Ketal) [16α,17α-Methylene - 6 - Fluoro - 11 - Ketoprogesterone-3,20-Bis-(Ethylene Ketal)] (XIXb)*

Following the procedure of Example 107, but substituting 16α,17α-methylene-6β-fluoro-4-pregnene-3,11,20-trione (XIXa) (from Example 63) as starting material, yields crystalline 16α,17α-methylene-6-fluoro-5-pregnene-3,11,20-trione 3,20-bis(ethylene ketal) (XIXb).

*Example 111.—16α,17α-Methylene-6-Chloro-5-Pregnene-3,11,20-Trione 3,20-Bis(Ethylene Ketal) [16α,17α-Methylene - 6 - 11 - Ketoprogesterone 3,20-Bis-(Ethylene Ketal)] (XIXb)*

Following the procedure of Example 107, but substituting 16α,17α-methylene-6α-chloro-4-pregnene-3,11,20-trione (XIXa) (from Example 64) as starting material, yields pure, crystalline 16α,17α-methylene-6-chloro-5-pregnene-3,11,20-trione 3,20-bis(ethylene ketal) (XIXb).

*Example 112.—16α,17α-Methylene-11β-Hydroxy-5-Pregnene-3,20-Dione 3,20-Bis(Ethylene Ketal) [16α,17α-Methylene-11β-Hydroxyprogesterone 3,20-Bis(Ethylene Ketal)] (XIXc)*

To a solution of 10 g. of lithium aluminum hydride suspended in 800 ml. of ether is added 10 g. of 16α,17α-methylene-5-pregnene - 3,11,20 - trione 3,20 - bis(ethylene ketal) (XIXb) (from Example 107) dissolved in 500 ml. of ether. This mixture is stirred for about 45 minutes at room temperature after which time it is refluxed for about one hour and then cooled and hydrolyzed with water. The precipitate and water are extracted repeatedly with ether and the combined ether extracts are evaporated after washing with water and drying with anhydrous sodium sulfate. The resulting crystalline residue is essentially a quantitative yield of crude 16α,17α-methylene-11β-hydroxy-progesterone 3,20-bis-(ethylene ketal) (XIXc), which on recrystallization gives the pure, light colored, crystalline product.

*Example 113.—16α,17α-Methylene-6 - Methyl - 11 β -Hydroxy-5-Pregnene-3,20-Dione 3,20-Bis(Ethylene Ketal) [16α,17α-Methylene-6-Methyl-11β - Hydroxyprogesterone 3,20-Bis(Ethylene Ketal)] (XIXc)*

Following the procedure of Example 112 but substituting 16α,17α-methylene-6-methyl-5-pregnene-3,11,20-trione 3,20-bis(ethylene ketal) (XIXb) (from Example 108) as starting material, yields crystalline 16α,17α-methylene-6-methyl-11β-hydroxy-5-pregnene-3,20 - dione 3,20-bis(ethylene ketal) (XIXc).

*Example 114.—16α,17α-Methylene - 6 - Fluoro - 11β - Hydroxy-5-Pregnene-3,20 Dione 3,20-Bis(Ethylene Ketal) [16α,17α-Methylene-6-Fluoro - 11β - Hydroxyprogesterone 3,20-Bis(Ethylene Ketal)] (XIXc)*

Following the procedure of Example 112, but substituting 16α,17α-methylene-6-fluoro-5-pregnene-3,11,20-trione 3,20-bis(ethylene ketal) (XIXb) (from Example 109) as starting material, yields crystalline 16α,17α-methylene-6-fluoro-11β-hydroxy-5-pregnene-3,20-dione 3,20-bis(ethylene ketal) (XIXc).

*Example 115.—16α,17α-Methylene - 6 - Chloro - 11β - Hydroxy-5-Pregnene-3,20-Dione 3,20-Bis(Ethylene Ketal) [16α,17α-Methylene-6-Chloro - 11β - Hydroxyprogesterone 3,20-Bis(Ethylene Ketal)] (XIXc)*

Following the procedure of Example 112, but substituting 16α,17α-methylene-6-chloro-5-pregnene-3,11,20-trione 3,20-bis(ethylene ketal) (XIXb) (from Example 111) as starting material, yields light colored, crystalline 16α,17α-methylene-6-chloro-11β-hydroxy-5-pregnene - 3,20 - dione 3,20-bis(ethylene ketal) (XIXc).

*Example 116.—16α,17α-Methylene-11β - Hydroxy-4-Pregnene-3,20-Dione (16α,17α - Methylene - 11β - Hydroxyprogesterone) (XIX)*

To a solution of 2 g. of 16α,17α-methylene-11β-hydroxyprogesterone 3,20-bis(ethylene ketal) (XIXc) (from Example 112), in 75 ml. of acetone, is added one ml. of concentrated sulfuric acid in 25 ml. of water and the resulting acidic mixture allowed to stand for about 15 hours. The solution is then concentrated and water added until crystallization takes place. The thus obtained 16α,17α-methylene-11β-hydroxyprogesterone (XIX) is collected on a filter and purified by recrystallization from ethyl acetate to give pure 16α,17α-methylene-11β-hydroxyprogesterone (XIX).

*Example 117.—16α,17α-Methylene-6α-Methyl - 11β - Hydroxy-4-Pregnene-3,20-Dione (16α,17α - Methylene-6α-Methyl-11β-Hydroxyprogesterone) (XIX)*

Following the procedure of Example 116, but substituting 16α,17α-methylene-6-methyl-11β-hydroxy-5-pregnene-3,20-dione 3,20-bis(ethylene ketal) (XIXc) (from Example 113) as starting material, yields crystalline 16α,17α-methylene-6α-methyl-11β-hydroxy-4-pregnene-3,20 - dione (XIX).

*Example 118.—16α,17α-Methylene-6α - Fluoro - 11β - Hydroxy-4-Pregnene-3,20-Dione (16α,17α - Methylene-6α-Fluoro-11β-Hydroxyprogesterone) (XIX)*

Following the procedure of Example 116, but substituting 16α,17α-methylene-6-fluoro-11β-hydroxy-5-pregnene- 3,20-dione 3,20-bis(ethylene ketal) (XIXc) (from Example 114) as starting material, yields crystalline 16α,17α-methylene-6α fluoro-11β hydroxy - 4 - pregnene - 3,20-dione (XIX).

*Example 119.—16α,17α-Methylene-6α-Chloro - 11β - Hydroxy-4-Pregnene-3,20-Dione (16α,17α - Methylene-6α-Chloro-11β-Hydroxyprogesterone) (XIX)*

Following the procedure of Example 116, but substituting 16α,17α-methylene-6-chloro-11β-hydroxy-5-pregnene-3,20-dione 3,20-bis(ethylene ketal) (XIX) (from Example 115) as starting material, yields light, crystalline 16α,17α-methylene-6α-chloro-11β-hydroxy-4-pregnene-3,20 - dione (XIX).

*Example 120.—16α,17α - Methylene - 9α - Fluoro - 11β-Hydroxy - 4 - Pregnene - 3,20 - Dione (16α,17α-Methylene - 9α - Fluoro - 11β - Hydroxyprogesterone) (XXV)*

(a) A mixture of 1 g. of 16α,17α-methylene-11β-hydroxy-4-pregnene-3,20-dione (XIX) (from Example 116), 650 mg. of N-bromoacetamide and 6 ml. of pyridine is stirred in the dark for a period of about 30 minutes. The mixture is cooled in an ice-water bath and a stream of sulfur dioxide is directed onto the surface of the stirred mixture until a negative potassium iodide-starch test is obtained. Fifty ml. of water is then added to the mixture and the mixture maintained at about 5° C. for about 30 minutes. The precipitated white solid is filtered, washed with water and dried under vacuum. After crystallization from acetone there is obtained crystalline 16α,17α - methylene - 4,9(11) - pregnadiene - 3,20 - dione (XXII).

(b) 0.5 gram of 16α,17α-methylene-4,9(11)-pregnadiene-3,20-dione (XXII) is dissolved in 20 ml. of methylene chloride and thereto is added a solution of 1 ml. of 71% perchloric acid in 10 ml. of water and 200 mg. of N-bromoacetamide in 50 ml. of tertiary butyl alcohol. The solution is maintained at room temperature for about fifteen minutes and then mixed with a solution of 0.3 of sodium sulfite in 12 ml. of water. The mixture is distilled at reduced pressure until the residual solution becomes cloudy. The product is then precipitated by the addition of 100 ml. of a mixture of ice-water. The white crystalline precipitate is filtered, washed with water, and then dried to give crystalline 16α,17α-methylene-9α-bromo-11β-hydroxy-4-pregnene-3,20-dione (XXIII).

(c) A mixture of 0.45 g. of 16α,17α-methylene-9α-bromo - 11β - hydroxy - 4 - pregnene - 3,20 - dione (XXIII), 0.45 g. of anhydrous potassium acetate and 20 ml. of acetone is heated at its refluxing temperature for a period of 5 hours. The mixture is then cooled and poured into water and extracted with methylene chloride. The methylene chloride extract is dried and poured over a column of 25 grams of Florisil. The column is developed with Skellysolve B containing increasing proportions of acetone. The Skellysolve B plus 10% acetone eluate contains 16α,17α - methylene - 9β,11β - oxido - 4 - pregnene-3,20-dione (XXIV).

(d) A solution of 1 g. of 16α,17α-methylene-9β,11β-oxido-4-pregnene-3,20-dione (XXIV) is dissolved in 50 ml. of methylene chloride and thereto is added 5 ml. of 48% hydrofluoric acid. The mixture is stirred vigorously for about 6 hours and then poured into an excess of cold aqueous 5% sodium bicarbonate solution. The methylene chloride layer is separated, dried with anhydrous sodium sulfate and then poured over a column of 100 of Florisil. The column is developed with Skellysolve B and acetone, the fractions containing 10% acetone are evaporated to dryness and recrystallized from acetone and Skellysolve B to give pure crystalline 16α,17α - methylene - 9α - fluoro - 11β - hydroxy - 4 - pregnene-3,20-dione (XXV).

*Example 121.—16α,17α - Methylene - 9α - Fluoro - 6α-Methyl - 11β - Hydroxy - 4 - Pregnene - 3,20 - Dione (16α,17α - Methylene - 9α - Fluoro - 6α - Methyl - 11β-Hydroxyprogesterone) (XXV)*

Following the procedure of Example 120, but substituting 16α,17α - methylene - 6α - methyl - 11β - hydroxy-4-pregnene-3,20-dione (XIX) (from Example 117) as starting material, yields crystals of 16α,17α-methylene-9α-fluoro - 6α - methyl - 11β - hydroxy - 4 - pregnene - 3,20-dione (XXV).

*Example 122.—16α,17α - Methylene - 6α,9α - Difluoro-11β - Hydroxy - 4 - Pregnene - 3,20 - Dione (16α,17α-Methylene - 6α,9α - Difluoro-11β - Hydroxyprogesterone) (XXV)*

Following the procedure of Example 120, but substituting 16α,17α - methylene - 6α - fluoro - 11β - hydroxy-4-pregnene-3,20-dione (XIX) (from Example 118) as starting material, yields crystalline 16α,17α-methylene-6α,9α - difluoro - 11β - hydroxy - 4 - pregnene - 3,20 - dione (XXV).

*Example 123.—16α,17α - Methylene - 9α - Fluoro - 6α-Chloro - 11β - Hydroxy - 4 - Pregnene - 3,20 - Dione (16α,17α - Methylene - 9α -Fluoro - 6α - Chloro - 11β-Hydroxyprogesterone) (XXV)*

Following the procedure of Example 120, but substituting 16α,17α - methylene - 6α - chloro - 11β - hydroxy - 4-pregnene-3,20-dione (XIX) (from Example 119) as starting material, yields light colored, crystalline 16α,17α-methylene - 9α - fluoro - 6α - chloro - 11β - hydroxy - 4-pregnene-3,20-dione (XXV).

*Example 124.—16α,17α - Methylene - 9α - Fluoro - 11β-Hydroxy - 4,6 - Pregnadiene - 3,20 - Dione (XXV), 16α,17α - Methylene - 9α - Fluoro - 6 - Methyl - 11β-Hydroxy - 4,6 - Pregnadiene - 3,20 - Dione (XXV), 16α,17α - Methylene - 6,9α - Difluoro - 11β - Hydroxy-4,6 - Pregnadiene - 3,20 - Dione (XXV), and 16α,17α-Methylene - 9α - Fluoro - 6 - Chloro - 11β - Hydroxy-4,6-Pregnadiene-3,20-Dione (XXV)*

Following the procedure of Example 120, but substituting as starting materials, 16α,17α-methylene-11β-hydroxy-4,6 - pregnadiene - 3,20 - dione (XIX) (from Example 91), 16α,17α - methylene - 6 - methyl - 11β - hydroxy-4,6-pregnadiene-3,20-dione (XIX) (from Example 92), 16α,17α - methylene - 6 - fluoro - 11β - hydroxy - 4,6-pregnadiene-3,20-dione (XIX) (from Example 93), and 16α,17α - methylene - 6 - chloro - 11β - hydroxy - 4,6-pregnadiene-3,20-dione (XIX) (from Example 94) yields, respectively, light colored, crystalline 16α,17α-methylene-9α - fluoro - 11β - hydroxy - 4,6 - pregnadiene - 3,20 - dione (XXV), 16α,17α-methylene-9α-fluoro-6-methyl-11β-hydroxy-4,6-pregnadiene-3,20-dione (XXV), 16α,17α-methylene - 6,9α - difluoro - 11β - hydroxy - 4,6 - pregnadiene - 3,20 - dione (XXV) and 16α,17α - methylene-9α -fluoro - 6 - chloro - 11β - hydroxy - 4,6 - pregnadiene-3,20-dione (XXV).

*Example 125.—16α,17α - Methylene - 9α - Fluoro - 11β-Hydroxy - 1,4 - Pregnadiene - 3,20 - Dione (XXV), 16α,17α - Methylene - 9α - Fluoro - 6α - Methyl - 11β-Hydroxy - 1,4 - Pregnadiene - 3,20 - Dione (XXV), 16α,17α - Methylene - 6α,9α - Difluoro - 11β - Hydroxy - 1,4 - Pregnadiene - 3,20 - Dione (XXV), 16α, 17α - Methylene - 6β,9α - Difluoro - 11β - Hydroxy-1,4 - Pregnadiene - 3,20 - Dione (XXV) and 16α,17α-Methylene - 9α - Fluoro - 6α -Chloro - 11β - Hydroxy-1,4-Pregnadiene-3,20-Dione (XXV)*

Following the procedure of Example 120, but substituting as starting materials, 16α,17α-methylene-11β-hydroxy-1,4 - pregnadiene - 3,20 - dione (XIX) (from Example 96), 16α,17α - methylene - 6α - methyl - 11β - hydroxy-1,4 - pregnadiene - 3,20 - dione (XIX) (from Example 97), 16α,17α - methylene - 6α - fluoro - 11β - hydroxy- 1,4-pregnadiene-3,20-dione (XIX) (from Example 98), 16α,17α - methylene - 6β - fluoro - 11β - hydroxy - 1,4-pregnadiene-3,20-dione (XIX) (from Example 99) and 16α,17α - methylene - 6α - chloro - 11β - hydroxy - 1,4-pregnadiene-3,20-dione (XIX) (from Example 100) yields, respectively, light colored, crystalline 16α,17α-methylene - 9α-fluoro - 11β - hydroxy - 1,4 - pregnadiene-3,20 - dione (XXV), 16α,17α - methylene - 9α - fluoro-6α - methyl - 11β - hydroxy - 1,4 - pregnadiene - 3,20-dione (XXV), 16α,17α-methylene-6α-,9α-difluoro-11β-hydroxy - 1,4 -pregnadiene - 3,20 - dione (XXV), 16α,17α - methylene - 6β,9α - difluoro - 11β - hydroxy - 1,4-pregnadiene-3,20-dione (XXV) and 16α,17α-methylene-9α - fluoro - 6α - chloro - 11β - hydroxy - 1,4 - pregnadiene-3,20-dione (XXV).

*Example 126.* — *16α,17α-Methylene-9α-Fluoro-11β-Hydroxy-1,4,6-Pregnatriene-3,20-Dione (XXV), 16α,17α-Methylene - 9α-Fluoro - 6 - Methyl-11β-Hydroxy-1,4,6-Pregnatriene-3,20-Dione (XXV), 16α,17α-Methylene-6,9α - Difluoro - 11β-Hydroxy-1,4,6-Pregnatriene-3,20-Dione (XXV) and 16α,17α-Methylene-9α-Fluoro-6-Chloro - 11β - Hydroxy-1,4,6-Pregnatriene-3,20-Dione (XXV)*

Following the procedure of Example 120, but substituting as starting materials, 16α,17α-methylene-11β-hydroxy-1,4,6-pregnatriene-3,20-dione (XIX) (from Example 102), 16α,17α - methylene - 6-methyl-11β-hydroxy-1,4,6-pregnatriene-3,20-dione (XIX) (from Example 103), 16α,17α - methylene - 6 - fluoro-11β-hydroxy-1,4,6-pregnatriene-3,20-dione (XIX) (from Example 104) and 16α,17α-methylene - 6-chloro-11β-hydroxy-1,4,6-pregnatriene-3,20-dione (XIX) (from Example 105) yields, respectively, light color, crystalline 16α,17α-methylene-9α-fluoro-11β-hydroxy-1,4,6-pregnatriene-3,20-dione (XXV), 16α,17α-methylene - 9α-fluoro-6-methyl-11β-hydroxy-1,4,6-pregnatriene-3,20-dione (XXV), 16α,17α-methylene-6,9α-difluoro-11β-hydroxy-1,4,6-pregnatriene-3,20-dione (XXV) and 16α,17α - methylene - 9α - fluoro-6-chloro-1,4,6-pregnatriene-3,20-dione (XXV).

*Example 127.—16α,17α - Methylene - 9α - Fluoro-4-Pregnene-3,11,20-Trione (16α,17α-Methylene-9α-Fluoro-11-Keto-progesterone) (XXVI)*

To a solution of 0.2 gram of 16α,17α-methylene-9α-fluoro-11β-hydroxy-4-pregnene-3,20-dione (XXV) (from Example 120) in 4 ml. of acetic acid is added 60 mg. of chromic anhydride, dissolved in 1 ml. of acetic acid and 0.1 ml. of water. The mixture is allowed to stand at room temperature for a period of about 4 hours, then poured into 50 ml. of water, neutralized with sodium bicarbonate and extracted with three 10 ml. portions of methylene chloride. The methylene chloride extracts are combined, washed with water, dried over anhydrous sodium sulfate, evaporated, and the thus produced residue twice recrystallized from methanol to give 16α,17α-methylene-9α-fluoro-4-pregnene-3,11,20-trione (XXVI).

*Example 128.—16α,17α-Methylene-9α-Fluoro-6α-Methyl-4 - Pregnene - 3,11,20-Trione (16α,17α-Methylene-9α-Fluoro-6α-Methyl-11-Ketoprogesterone) (XXVI)*

Following the procedure of Example 127, but substituting 16α,17α-methylene-9α-fluoro-6α-methyl-11β-hydroxy-4-pregnene-3,20-dione (XXV) (from Example 121) as starting material, yields crystalline 16α,17α-methylene-9α-fluoro-6α-methyl-4-pregnene-3,11,20-trione (XXVI).

*Example 129. — 16α,17α - Methylene-6α,9α-Difluoro-4-Pregnene - 3,11,20 - Trione (16α,17α-Methylene-6α,9α-Difluoro-11-Ketoprogesterone) (XXVI)*

Following the procedure of Example 127, but substituting 16α,17α-methylene-6α,9α-difluoro-11β-hydroxy-4-pregnene-3,20-dione (XXV) (from Example 122) as starting material, yields crystalline 16α,17α-methylene-6α,9α-difluoro-4-pregnene-3,11,20-trione (XXVI).

*Example 130.—16α,17α-Methylene-9 -Fluoro-6α-Chloro-4 - Pregnene - 3,11,20-Trione (16α,17α-Methylene-9α-Fluoro-6α-Chloro-11-Ketoprogesterone) (XXVI)*

Following the procedure of Example 127, but substituting 16α,17α-methylene-9α-fluoro-6α-chloro-11β-hydroxy-4-pregnene-3,20-dione (XXV) (from Example 123) as starting material, yields light colored, crystalline 16α-17α-methylene - 9α-fluoro-6α-chloro-4-pregnene-3,11,20-trione (XXVI).

*Example 131. — 16α,17α-Methylene-9α-Fluoro-4,6-Pregnadiene-3,11,20-Trione (XXVI), 16α,17α-Methylene-9α - Fluoro - 6-Methyl-4,6-Pregnadiene-3,11,20-Trione (XXVI), 16α,17α-Methylene-6,9α-Difluoro-4,6-Pregnadiene-3,11,20-Trione (XXVI) and 16α,17α-Methylene-9α - Fluoro - 6 - Chloro-4,6-Pregnadiene-3,11,20-Trione (XXVI)*

Following the procedure of Example 127, but substituting as starting materials 16α,17α-methylene-9α-fluoro-11β-hydroxy-4,6-pregnadiene-3,20-dione (XXV) (from Example 124), 16α,17α-methylene-9α-fluoro-6-methyl-11β-hydroxy-4,6-pregnadiene-3,20-dione (XXV) (from Example 124), 16α,17α - methylene-6,9α-difluoro-11β-hydroxy-4,6-pregnadiene-3,20-dione (XXV) (from Example 124) and 16α,17α-methylene-9α-fluoro-6-chloro-11β-hydroxy-4,6-pregnadiene-3,20-dione (XXV) (from Example 124) yields, respectively, light colored, crystalline 16α,17α - methylene - 9α-fluoro-4,6-pregnadiene-3,11,20-trione (XXVI), 16α,17α-methylene-9α-fluoro-6-methyl-4,6-pregnadiene-3,11,20-trione (XXV), 16α,17α-methylene-9α-fluoro - 6,9α - difluoro - 4,6 - pregnadiene - 3,11,20-trione (XXVI) and 16α,17α-methylene-9α-fluoro-6-chloro-4,6-pregnadiene-3,11,20-trione (XXVI).

*Example 132.—16α,17α-Methylene-9α-Fluoro-1,4-Pregnadiene-3,11,20-Trione (XXVI), 16α,17α-Methylene-9α-Fluoro - 6α - Methyl - 1,4 - Pregnadiene-3,11,20-Trione (XXVI), 16α,17α-Methylene-6α,9α-Difluoro-1,4-Pregnadiene-3,11,20-Trione (XXVI), 16α,17α-Methylene-6β,9α - Difluoro - 1,4 - Pregnadiene - 3,11,20 - Trione (XXVI) and 16α,17α-Methylene-9α-Fluoro-6α-Chloro-1,4-Pregnadiene-3,11,20-Trione (XXVI)*

Following the procedure of Example 127, but substituting as starting materials 16α,17α-methylene-9α-fluoro-11β-hydroxy-1,4-pregnadiene-3,20-dione (XXV) (from Example 125), 16α,17α-methylene-9α-fluoro-6α-methyl-11β-hydroxy-1,4-pregnadiene-3,20-dione (XXV) (from Example 125), 16α,17α-methylene-6α,9α-difluoro-11β-hydroxy-1,4-pregnadiene-3,20-dione (XXV) (from Example 125), 16α,17α-methylene-6β,9α-difluoro-11β-hydroxy-1,4-pregnadiene-3,20-dione (XXV) (from Example 125) and 16α,17α-methylene-9α-fluoro-6α-chloro-11β-hydroxy-1,4-pregnadiene-3,20-dione (XXV) (from Example 125) yields, respectively, light colored, crystalline 16α,17α-methylene - 9α - fluoro - 1,4 - pregnadiene-3,11,20-trione (XXVI), 16α,17α - methylene - 9α-fluoro-6α-methyl-1,4-pregnadiene-3,11,20-trione (XXVI), 16α,17α-methylene-6α,9α - difluoro-1,4-pregnadiene-3,11,20-trione (XXVI), 16α,17α - methylene-6β,9α-difluoro-1,4-pregnadiene-3,11,20-trione (XXVI) and 16α,17α-methylene-9α-fluoro-6α-chloro-1,4-pregnadiene-3,11,20-trione (XXVI).

*Example 133.—16α,17α-Methylene-9α-Fluoro-1,4,6-Pregnatriene-3,11,20-Trione (XXVI), 16α,17α-Methylene-9α - Fluoro-6-Methyl-1,4,6-Pregnatriene-3,11,20-Trione (XXVI), 16α,17α-Methylene-6,9α-Difluoro-1,4,6-Pregnatriene-3,11,20-Trione (XXVI) and 16α,17α-Methylene - 9α - Fluoro - 6-Chloro-1,4,6-Pregnatriene-3,11,20-Trione (XXVI)*

Following the procedure of Example 127, but substituting as starting materials 16α,17α-methylene-9α-fluoro-11β-hydroxy-1,4,6-pregnatriene-3,20-dione (XXV) (from Example 126), 16α,17α-methylene-9α-fluoro-6-methyl-11β-hydroxy-1,4,6-pregnatriene-3,20-dione (XXV) (from Example 126), 16α,17α-methylene-9α-fluoro-6,9α-difluoro - 11β - hydroxy-1,4,6-pregnatriene-3,20-dione (XXV) (from Example 126) and 16α,17α-methylene-9α-fluoro-6-chloro-11β-hydroxy-1,4,6-pregnatriene-3,20-dione (XXV) (from Example 126) yields, respectively, light-colored, crystalline 16α,17α - methylene-9α-fluoro-1,4,6-pregnatriene-3,11,20-trione (XXVI), 16α,17α-methylene-9α-fluoro-6-methyl-1,4,6-pregnatriene-3,11,20-trione (XXVI), 16α,17α - methylene-6,9α-difluoro-1,4,6-pregnatriene-3,11,20-trione (XXVI) and 16α,17α-methylene-9α-fluoro-6-chloro-1,4,6-pregnatriene-3,11,20-trione (XXVI).

We claim:
1. Compounds of the formula

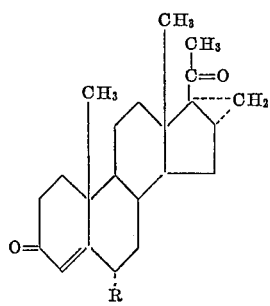

wherein R is selected from the group consisting of methyl, fluorine and chlorine.

2. 16α,17α - methylene - 6α - methyl-4-pregnene-3,20-dione.
3. 16α,17α-methylene-6α-fluoro-4-pregnene-3,20-dione.
4. 16α,17α-methylene-6α-chloro-4-pregnene-3,20-dione.
5. Compounds of the formula

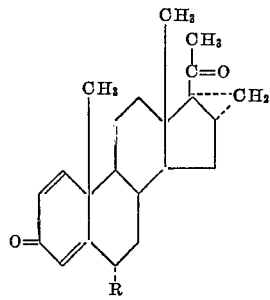

wherein R is selected from the group consisting of methyl, fluorine and chlorine.

6. 16α,17α-methylene - 6α - methyl-1,4-pregnadiene-3,20-dione.
7. 16α,17α - methylene-6α-fluoro-1,4-pregnadiene-3,20-dione.
8. 16α,17α - methylene-6α-chloro-1,4-pregnadiene-3,20-dione.
9. Compounds of the formula

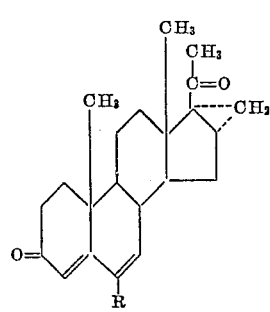

wherein R is selected from the group consisting of methyl, fluorine and chlorine.

10. 16α,17α-methylene-6-methyl - 4,6 - pregnadiene-3,20-dione.
11. 16α,17α - methylene-6-fluoro-4,6-pregnadiene-3,20-dione.

12. 16α,17α - methylene-6-chloro-4,6-pregnadiene-3,20-dione.
13. Compounds of the formula

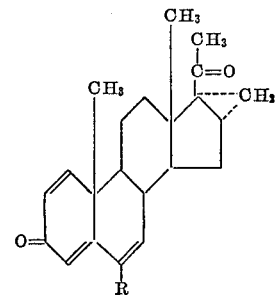

wherein R is selected from the group consisting of methyl, fluorine and chlorine.

14. 16α,17α - methylene-6-methyl-1,4,6-pregnatriene-3,20-dione.
15. 16α,17α-methylene-6-fluoro - 1,4,6 - pregnatriene-3,20-dione.
16. 16α,17α - methylene-6-chloro-1,4,6-pregnatriene-3,20-dione.
17. A process for the production of a compound of the formula

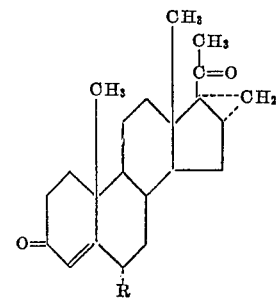

wherein R is selected from the group consisting of hydrogen, methyl, fluorine and chlorine, which comprises reacting a compound of the formula

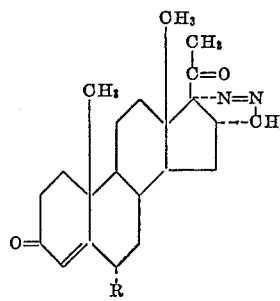

wherein R has the same meaning as above, with a strong acid.

18. A process for the production of a compound of the formula

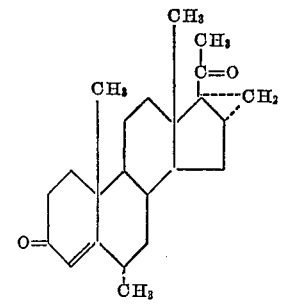

which comprises reacting a compound of the formula

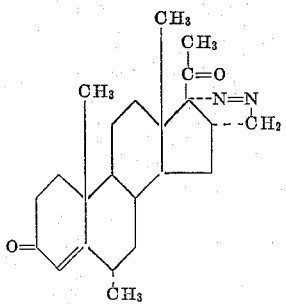

with a strong acid.

19. A process for the production of a compound of the formula

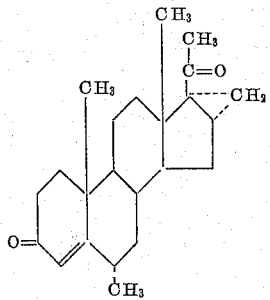

which comprises reacting a compound of the formula

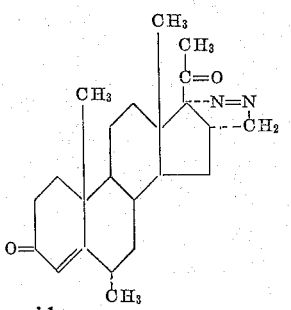

with perchloric acid.

20. A process for the production of a compound of the formula

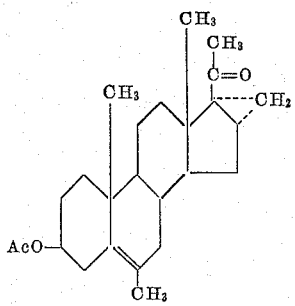

wherein Ac is the acyl radical of an organic carboxylic acid containing from one to twelve carbon atoms, inclusive, which comprises reacting a compound of the formula

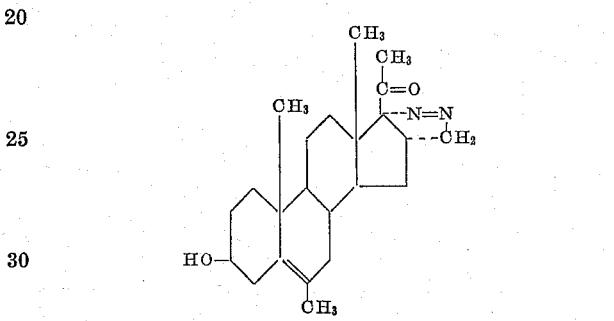

with a strong acid selected from the group consisting of boron trifluoride and perchloric acid and acylating the thus formed product with an acyl anhydride wherein the acyl radical is that of an organic carboxylic acid containing from one to twelve carbon atoms, inclusive.

No references cited.